United States Patent
Saikawa et al.

[11] Patent Number: 5,986,813
[45] Date of Patent: Nov. 16, 1999

[54] HEAD MOUNTED TYPE DISPLAY APPARATUS CAPABLE OF GENERATING OR DETECTING VIBRATIONS

[75] Inventors: Haruko Saikawa, Hachioji; Seiichiro Tabata, Hino, both of Japan

[73] Assignee: Olympus Optical Co., Ltd., Tokyo, Japan

[21] Appl. No.: 08/916,550

[22] Filed: Aug. 22, 1997

[30] Foreign Application Priority Data

Aug. 23, 1996 [JP] Japan ................................ 8-222776

[51] Int. Cl.⁶ ........................................... G02B 27/14
[52] U.S. Cl. ............................................. 359/630
[58] Field of Search ........................ 359/630, 631, 359/633, 636, 638; 345/7, 8; 381/368, 388

[56] References Cited

U.S. PATENT DOCUMENTS

| | | | |
|---|---|---|---|
| 3,787,641 | 1/1974 | Santori | 381/368 |
| 4,152,553 | 5/1979 | White | 379/430 |
| 5,577,981 | 11/1996 | Jarvik | 482/4 |
| 5,589,846 | 12/1996 | Kobayashi | 345/8 |
| 5,696,521 | 12/1997 | Robinson et al. | 345/8 |

FOREIGN PATENT DOCUMENTS

| | | |
|---|---|---|
| 1-1333479 | 5/1989 | Japan . |
| 3-289615 | 12/1991 | Japan . |

*Primary Examiner*—Georgia Epps
*Assistant Examiner*—Ricky Mack
*Attorney, Agent, or Firm*—Louis Weinstein

[57] ABSTRACT

A head mounted type display composed of a display device for displaying an optical picture based on inputted picture signal, an ocular optical system for projecting the picture to an eye of the user, a head band, forehead resting section and right- and left-hand side head supporting sections for supporting a body section including the display device and the ocular optical system while being brought into contact with a head section of the user, a vibration device placed on each of the right- and left-hand side head supporting sections for receiving a caution signal to vibrate the vibration device to give a caution to the user. With this arrangement, the head mounted type display apparatus can surely give a caution to the user without affecting a picture and a sound.

32 Claims, 13 Drawing Sheets

HEAD MOUNTED TYPE DISPLAY APPARATUS CAPABLE OF GENERATING OR DETECTING VIBRATIONS

BACKGROUND OF THE INVENTION

1. Field of the Invention

The present invention relates to a head mounted type display apparatus, and more particularly to a head mounted type display apparatus using a display device and an ocular optical system in a state of being mounted on a head section of the user.

2. Description of the Related Art

To date, various types of head mounted type display apparatus such as a head mounted display have been proposed which extends downwardly from the head section of the user to cover the user's face when mounted. Unlike different portable displays, these types of display apparatus are advantageous in that a picture is observable without the use of the hands.

As one of such head mounted type display apparatus there has been known a binocular display apparatus, such as is disclosed in Japanese Unexamined Patent Publication No. 3-289615, which comprises first and second small-sized display units respectively capable of independently presenting picture displays, first and second optical systems for enlarging each of the displayed pictures on the first and second display units so that the pictures are separately visible with both eyes, a view mechanism for holding the first and second optical systems and the first and second display units and further for separately intercepting the external light at least between the first display unit and the first optical system and between the second display unit and the second optical system, a carrying body mounted and used on the head section or the like of the user so that the first optical system held by the view mechanism comes in the right-eye's field of view while the second optical system held thereby enters the left-eye's field of view, and a control means for taking charge of the display control of the first and second display units.

In addition, Japanese Unexamined Patent Publication No. 1-133479 has disclosed another head mounted type display apparatus designed as a visual system in which a light-emitting section of a television is located to be in the dead angle of both the eyes of the user and the television screen taking the light-emitted condition just reaches both the eyes through a concave mirror and which is arranged to be detachably mounted on the head section.

On the other hand, headphones have generally been employed as a sound outputting means applicable to the aforesaid head mounted type display apparatus. These headphones are classified into a hermetic headphone of the type of shutting out the environmental noises to allow the outputted sound to be clearly audible, an open headphone of the type whereby both the environmental voices and outputted sound are audible and an inserted headphone of the type of achieving the reduction in weight and size to be insertable into the ears.

Moreover, as a sound inputting means applicable to the head mounted type display apparatus, there have been used a common microphone such as an air conduction type microphone, i.e., an electret ◊ capacitor microphone, the employment of which is made such that, for example, a segment flexible cord section is formed to extend from a supporting section of the head mounted type display apparatus and the aforesaid microphone is attached to its tip portion to approach the mouth of the user. In the case of using the foregoing head mounted type display apparatus as an information processing terminal, if a sound inputting means is provided and used as an inputting means to the information processing terminal, the inputting means such as a keyboard becomes unnecessary, which improves its portability.

However, in the case of the above-described prior head mounted type display apparatus, when receiving, for instance, an electronic mail in the middle of the mounting work, serious troubles can occur depending upon the kind of work because of informing the user of the reception through a sound or a picture. In addition, if using a display or a low voice which does not affect the work, there is a possibility that the user does not notice the reception news.

Moreover, in cases where the hermetic headphone is employed as the sound outputting means applicable to the aforesaid head mounted type display apparatus, the apparatus becomes larger in size and weight. On the other hand, in the case of using the open headphone, it is necessary that the headphone mounting position is adjusted so that the headphone position matches the ear positions, and hence an adjusting mechanism is required, which creates a problem in that the apparatus increases in weight and the adjusting work is troublesome. Further, in the case of employing the inserted headphone, it becomes difficult that the user inserts the inserted headphone into his ear after the mounting of the head mounted type display apparatus, and the cord plugged into the inserted headphone hangs close to the ear of the user to be in the way.

Still further, in the case of the prior sound inputting means applicable to the aforesaid head mounted type display apparatus, an extending section is required in order to bring the microphone close to the mouth of the user, which leads to the increase in weight of the apparatus.

OBJECTS AND SUMMARY OF THE INVENTION

Accordingly, it is a first object of the present invention to provide a head mounted type display apparatus which allows the user to certainly have perception without affecting the picture or sound.

A second object of this invention is to provide a head mounted type display apparatus which is capable of eliminating the need for the position adjusting work performed by the user and of achieving further reduction in weight as compared with a prior apparatus.

A third object of this invention is to provide a head mounted type display apparatus with a microphone which is capable of achieving a decrease in weight.

A fourth object of this invention is to provide a head mounted type display apparatus which is capable of making a vibration device come closely into contact with the head section by only assuming the mounted condition and which is capable of eliminating the need for fine position adjustment and the like.

A fifth object of this invention is to provide a head mounted type display apparatus which is capable of be stably supported by the head section.

A sixth object of this invention is to provide a head mounted type display apparatus which is capable of transferring vibration to the user with a high efficiency.

A seventh object of this invention is to provide a head mounted type display apparatus which is capable of allowing the user to have plural kinds of perceptions.

An eighth object of this invention is to provide a head mounted type display apparatus which is capable of allowing the user to visually confirm the perception based upon the vibration of a vibration device.

A ninth object of this invention is to provide a head mounted type display apparatus which is capable of detecting whether or not it is in the mounted condition.

A tenth object of this invention is to provide a head mounted type display apparatus which is capable of reducing power consumption.

An eleventh object of this invention is to provide a head mounted type display apparatus which is capable of attaining optimal vibration irrespective of the dimension of the head section of the user.

A twelfth object of this invention is to provide a head mounted type display apparatus which is capable of achieving a reduction in bath size and weight.

A thirteenth object of this invention is to provide a head mounted type display apparatus having a speaker which is capable of suppressing the leakage of a voice to the external surrounding.

A fourteenth object of this invention is to provide a head mounted type display apparatus which is capable of making a bone-conduction sound speaker come into close contact with the head section merely by assuming the mounted condition and further of eliminating the requirement for fine position adjustment and the like.

A fifteenth object of this invention is to provide a head mounted type display apparatus equipped with a microphone which is relatively free from the influence of external noise.

A sixteenth object of this invention is to provide a head mounted type display apparatus which is capable of making a bone-conduction sound microphone come closely into contact with the head section merely by assuming the mounted condition and further of eliminating the requirement for fine position adjustment and the like.

A seventeenth object of this invention is to provide a head mounted type display apparatus provided with a microphone which is capable of receiving a bone-conduction sound with a high sensitivity.

An eighteenth object of this invention is to provide a head mounted type display apparatus provided with a speaker and a microphone which are capable of effectively suppressing the occurrence of howling.

Briefly, in accordance with the present invention, a head mounted type display apparatus comprises a display device for displaying an optical picture on the basis of a picture signal inputted, an ocular optical system for projecting the picture to an eye of the user, a supporting section having a contact surface to support the display device and ocular optical system on a head section including a head and face of the user, and a vibration device placed on the contact surface of the supporting section for carrying out at least one of the delivery of vibration to the user and the reception of vibration from the user.

These as well as other objects and advantages of the present invention will become further apparent from the following detailed explanation.

DETAILED DESCRIPTION OF THE PREFERRED EMBODIMENTS

Embodiments of the present invention will be described hereinbelow with reference to the drawings.

Figure 1:
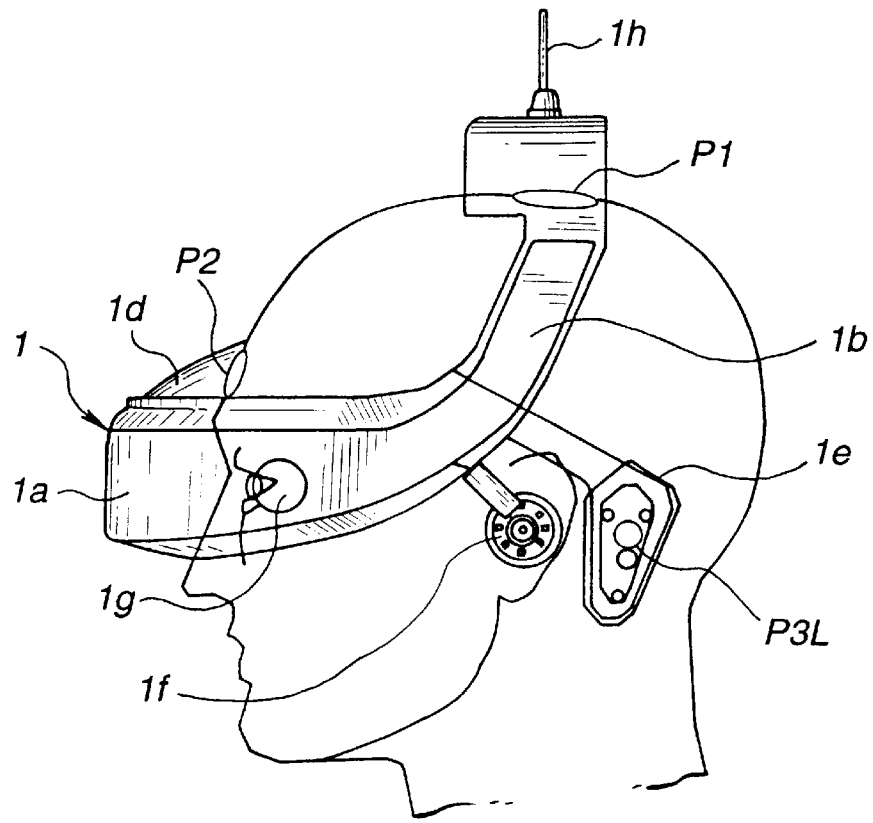
FIG. 1 is a perspective view showing a head mounted type display apparatus according to a first embodiment of the present invention which assumes a state of being mounted on a head section of the user, which is viewed from a side direction.

FIGS. 1 to 15 are illustrations for describing a first embodiment of this invention, and of these drawings, FIG. 1 is a perspective view showing a head mounted type display apparatus according to a first embodiment of the present invention which assumes a state of being mounted on a head section of the user, which is viewed from a side direction. This head mounted type display apparatus, designated by numeral 1, is composed of a body section 1a containing a component for picture display, a frame section 1b provided in connection with this body section 1a, a forehead resting section 1d placed on a front, central and upper portion of the body section 1a to serve as a supporting section and a forehead pressing section, a head band 1c (see FIGS. 3 and other illustrations) located inside the frame section 1b, i.e., a head contacted side of the frame section 1b, to act as a supporting section, side head supporting sections 1e each protruding from the vicinity of a connecting position of the frame section 1b to the body section 1a to a side head section behind an ear and including a plate spring being a elastic member and others to serve as a supporting section and a side head pressing section, and a speaker 1f extending downwardly, obliquely and rear from the vicinity of a front side of a proximal portion of the side head supporting section 1e.

Furthermore, on both side surface sections of the body section 1a, a mode switching button 1g is provided which is a push button for switching among three modes of a liquid crystal shutter 5 (see FIG. 2) which will be described later, and the mode selected is confirmable through a mode displaying LED placed on the inner side of the mode switching button.

Still further, right- and left-hand eye-width adjusting knobs 1j (see FIG. 5) are located at upper portions of the body section 1a, and the right- and left-hand optical axes due to a picture display unit, which will be mentioned later, built in the body section 1a are correctly adjustable to the eye width of the user in a manner that the picture display unit is shifted in the right and left directions.

This head mounted type display apparatus 1 is mounted as follows for use.

The spacing between right- and left-hand side head supporting sections 1e is enlarged (i.e. they are pulled apart) and then the entire head mounted type display apparatus 1 is put on the head. At this time, at a forehead supporting point P2 the forehead resting section 1d is brought into contact with the forehead, and at a head top supporting point P1 a pad of the head band 1c is placed into contact with a top portion of the head, and further at each of a left-hand side head supporting point P3L and a right-hand side head supporting point (not shown) (which will generally be referred hereinafter to as side head supporting points P3) a slightly larger width portion on the tip portion side of each of the side head supporting sections 1e is placed into contact with a portion behind an ear or slightly below the ear, and in this state the head mounted type display apparatus 1 is mounted on a head section and a picture is observable.

Moreover, in a manner that head band adjusters 1i (see FIGS. 3 to 5) located at right- and left-hand portions of the frame section 1b are shifted up and down, the relative vertical position of the head band 1c is adjusted with respect to the frame section 1b so that the head mounted type display apparatus 1 is mounted at an appropriate position irrespective of the dimension or size of the wearer's head. Incidentally, in the mounted condition, speakers 1f are not brought into contact with the ears and take a slightly separated condition, that is, the head mounted type display apparatus 1 is constructed as the so-called open headphone.

Figure 2:
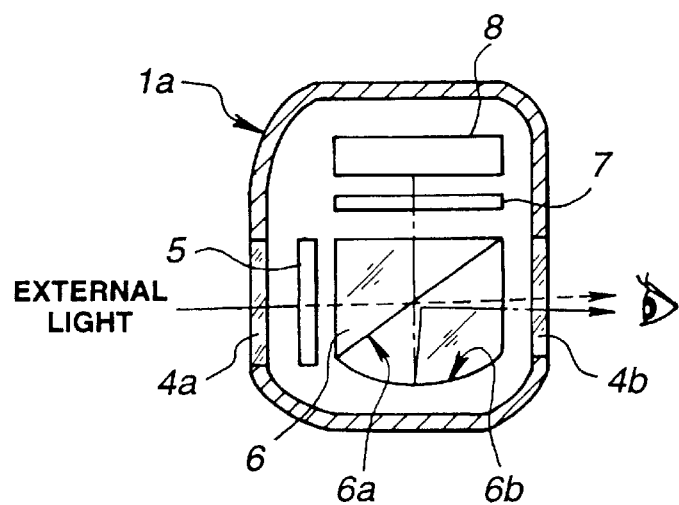
FIG. 2 is a cross-sectional view showing an arrangement of a picture display unit built in a body section of the head mounted type display apparatus according to the first embodiment.

FIG. 2 is a cross-sectional view showing an arrangement of the picture display unit incorporated into the body section 1a.

The external light incident through an objective window 4a located on the front side of the body section 1a and fitted woth a transparent cover is projected through a liquid crystal shutter 5 serving as an external light quantity varying means and a prism optical system 6 constituting an ocular optical system and further through an ocular window 4b onto the eyes of the user.

On the other hand, placed on upper portions of the prism optical system 6 are a display device 7, for example, comprising a liquid crystal display device (LCD) or the like to display an optical picture in accordance with a picture signal inputted and a back light 8 for illuminating the display device 7 from the rear surface side. A picture due to the display device 7 illuminated by the back light 8 is incident on the prism optical system 6 and, after passing through a half mirror provided at a substantially central portion within the prism optical system 6 to be generally inclined at 45 degrees, it is reflected upwardly on a concave mirror 6b formed on a bottom surface inner side of the prism optical system 6 to compose an enlarging optical system and then reflected backwardly on the half mirror 6a to be projected through the ocular window 4b to the eyes of the user so as to be observable as a virtual image.

In this arrangement of the picture display unit, the switching among the following three modes is selectively possible through the control of the liquid crystal shutter 5.

These three modes are a light intercepting mode in which the liquid crystal shutter 5 is set to the closed condition to cut off the incidence of the external light so that only the picture due to the display device 7 is observable, a see-through mode in which the liquid crystal shutter 5 is set to the open condition and the picture display due to the display device 7 is turned off so that only the external light is observable, and a superimposing mode in which the picture display due to the display device 7 is carried out and the liquid crystal shutter 5 is placed in the open condition so that the picture and the external light are observable in the superimposed condition.

Figure 3:
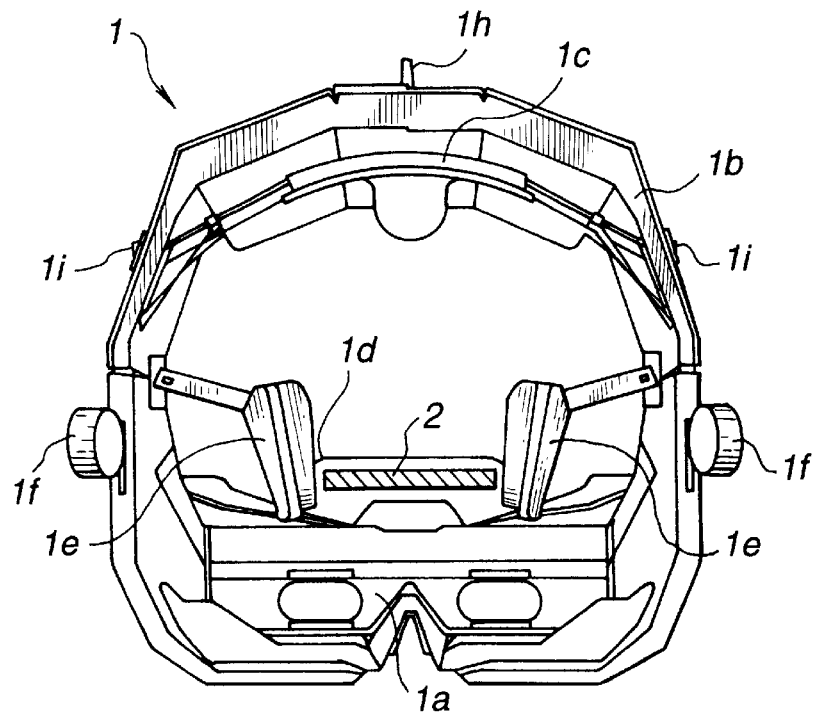
FIG. 3 is a bottom view showing the head mounted type display apparatus including a vibration device fitted to a forehead resting section in the first embodiment.

For example, in the aforesaid head mounted type display apparatus 1, as shown in FIG. 3, a vibration device 2 is attached to the forehead supporting point P2 being a portion which comes into contact with a skin of a head section of the user, and the vibration of this vibration device 2 produces a signal such as a caution signal whereby the user has a perception through a tactile sense of the skin. As this caution signal, for example, there are a signal indicative of the arrival of an electronic mail, a signal indicative of a mistake on an information processing operation, and a signal representative of a time, and others.

Since the vibration device 2 is for the purpose of sending a signal as vibration to the user as mentioned above, the position to be fitted is preferable to be, of the aforesaid plurality of supporting points, a portion which comes into contact with a portion where no hairs exist so as to expose the skin. For instance, at the head top supporting point P1 the vibration attenuates due to the hair, with the result that there is a possibility that the vibration can not sufficiently and effectively travel up to the tactile sense portion of the skin.

Figure 4:
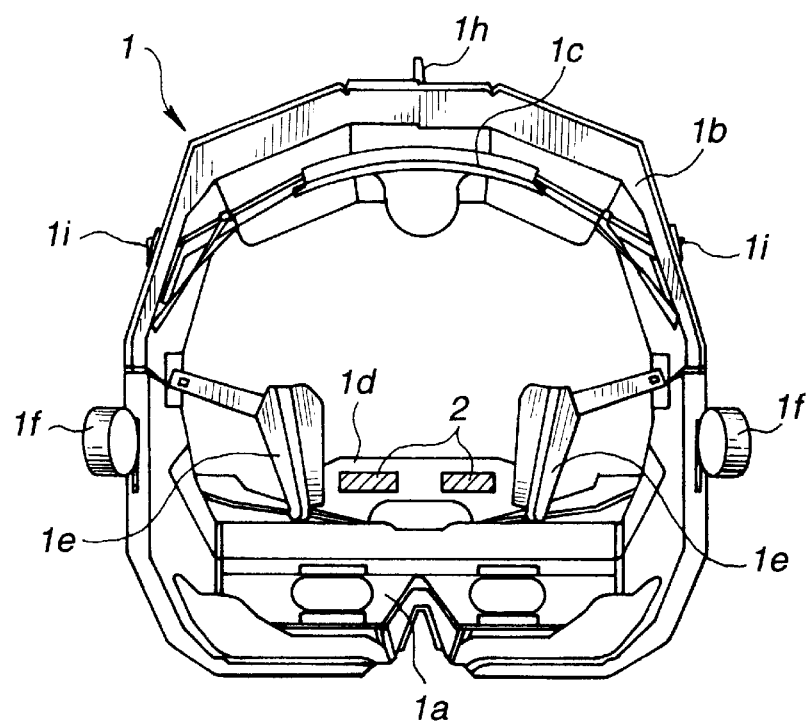
FIG. 4 is a bottom view showing the head mounted type display apparatus including a plurality of vibration devices fitted to a forehead resting section in the first embodiment.

FIG. 4 shows a fitting example of the vibration device 2 different from that of FIG. 3, where two vibration devices 2 are fitted to two right- and left-hand portions within the forehead supporting point P2.

Figure 5:
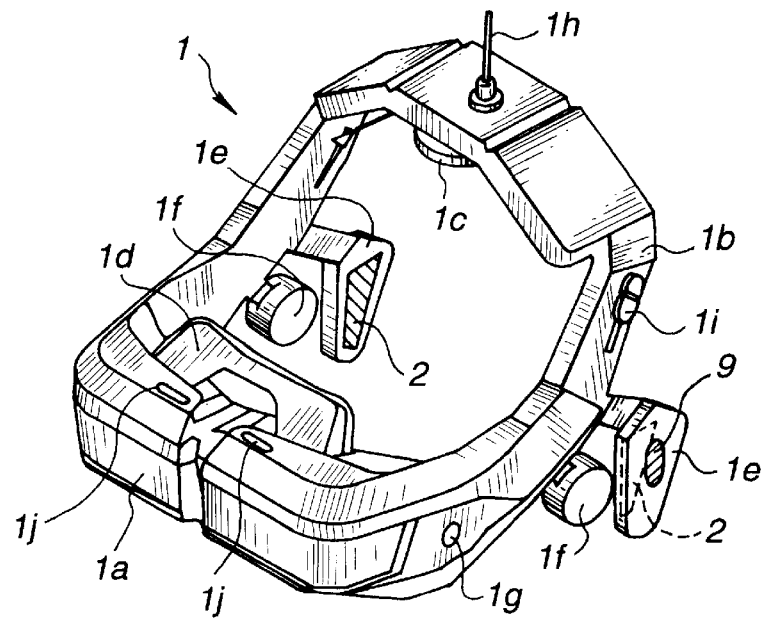
FIG. 5 is a perspective view showing a head mounted type display apparatus according to the first embodiment in which vibration devices are attached to right- and left-hand side head supporting sections.

Furthermore, FIG. 5 shows the case in which vibration devices 2 are installed at the right- and left-hand side head supporting points P3. As shown in the same illustration, outside the side head supporting section 1e carrying the vibration device 2 there is placed a vibration stopping switch 9 which is for the purpose of stopping the vibration of the vibration device 2. The reason why the vibration stopping switch 9 is positioned outside the vibration device 2 placed portion is for eliminating the need for searching the position of the switch when the user tries to stop the vibration of the vibration device 2.

On pressing the vibration stopping switch 9, not only the vibration of the vibration device 2 stops, but also a switching operation can be taken to display a picture representative of the contents of caution information from the caution signal.

Figure 6:
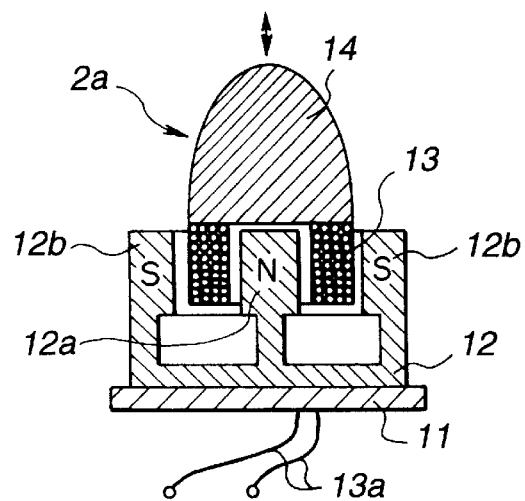
FIG. 6 is a vertical cross-sectional view showing a vibration device composed of a magnet and a coil in the first embodiment.

FIG. 6 is a cross-sectional view showing one example of concrete arrangements of the aforesaid vibration device 2.

In this vibration device 2a, a magnet 12 is put on a head pressing pad 11. In this magnet 12, an N-pole section 12a is vertically formed at a central portion of a bottom fitted cylindrical section in which its circumferential surface end portion serves as an S-pole section 12b. A doughnut space between the N-pole section 12a and the S-pole section 12b accepts a coil 13 to define a gap therebetween to avoid direct contact with the coil 13. A tactile sense transferring section 14 is integrally fitted to the coil 13. Further, both the end portions of the coil 13 are coupled to current applying terminals 13a.

In this arrangement, when an alternating current is applied through the terminals 13a, the amount of the current flowing in the coil 13 varies to generate a magnetic field which in turn, interacts with the magnetic field due to the magnet 12 to generate vibrations in the arrow directions shown in FIG. 6, i.e., in vertical directions, which varies the degree of the pressing force against the skin of the user. Thus, the user can notice the transmission of a signal through the skin's tactile sense.

The aforesaid vibration device 2a is a conversion element between an electric energy and a mechanical energy which converts an alternating current through a magnetic circuit into mechanical vibration, with the frequency of the vibration varying by the variation of the frequency of the alternating current to be given to the coil 13.

Figure 7:
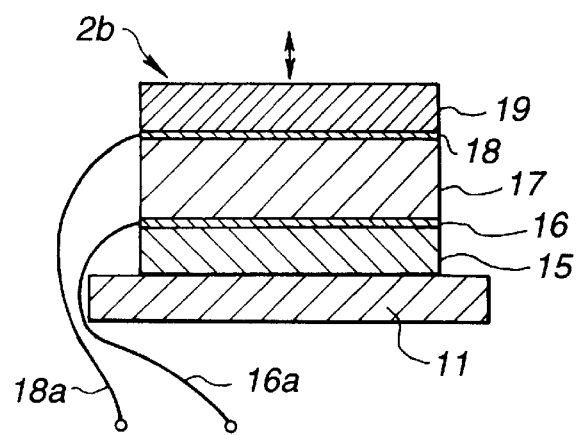
FIG. 7 is a vertical cross-sectional view showing a vibration device comprising a piezoelectric element in the first embodiment.

FIG. 7 is a cross-sectional view showing another example of a detailed arrangement of the vibration device 2.

In this vibration device 2b, piled up successively on a head pressing pad 11 are a vibration cut-off member 15 for cutting off the transmission of vibration to other portions, an electrode 16, a piezoelectric device 17 having a characteristic of expanding and contracting in an electric field applied, an electrode 18, and an elastic member 19 amplifying the amplitude of vibration. Further. the electrodes 16, 18 are coupled to current applying terminals 16a, 18a, respectively.

When an electric potential is applied across the electrodes 16, 18, an electric field occurs between these electrodes 16, 18 and is applied to the piezoelectric device 17. In response to this electric field, the piezoelectric device 17 expands or contracts in the direction of the electric field. Thus, if an alternating current is applied across the electrodes 16, 18, the piezoelectric device 17 alternately and repeatedly expands and contracts to create vibrations and, after its amplitude is amplified through the elastic member 19, the vibration is transferred as vibration in the directions indicated by arrows in FIG. 7, i.e., in vertical directions, which varies the degree of the pressing force against the skin of the user. Accordingly, the user can have perception about the transmission of a signal through the skin's tactile sense.

This vibration device 2b is also a conversion device between an electric energy and a mechanical energy, which can vary the frequency of the vibration in accordance with the variation of the frequency of the alternating current applied across the electrodes 16, 18.

Although the foregoing is the simplest example of arrangements of the vibration device 2b using a piezoelectric device, this invention is not limited to this example, and it is also possible to, for example, use an arrangement in which a plurality of piezoelectric devices polarized in different directions are adhered to each other to generate turning vibration.

In the case of employing the vibration device 2b, no coil is used unlike the above-mentioned vibration device 2a, and hence no magnetic field occurs. Accordingly, even if a head motion sensor depending upon the magnetism, that is, a sensor for detecting the direction or position of the head mounted type display apparatus 1 through the use of magnetism, is incorporated into the head mounted type display apparatus 1, the deterioration of the accuracy of the head motion sensor does not occur.

The head mounted type display apparatus 1 using the above-mentioned vibration device 2 can also be made such that the amplitude of vibration is controllable in accordance with the significance of the information. For example, a caution indicative of a simple mistake, the arrival of an electronic mail or the like is designed to assume vibration with a small amplitude, whereas a serious warning representative of the possibility of the deletion of data or the like is made to produce vibrations with a large amplitude.

Or, the control of a waveform of vibration is also feasible. For instance, there is a difference in sensation the user has between the case of giving vibration of a sine wave type and the case of giving vibration of a rectangular wave type, and therefore, it is possible to control the waveform of vibration in accordance with the kind of the caution to be given.

Needless to say, it is also possible to issue more complicated vibrations corresponding to the kinds of cautions through the control of the frequency, amplitude, duty ratio and others of the vibrations.

Figure 8:
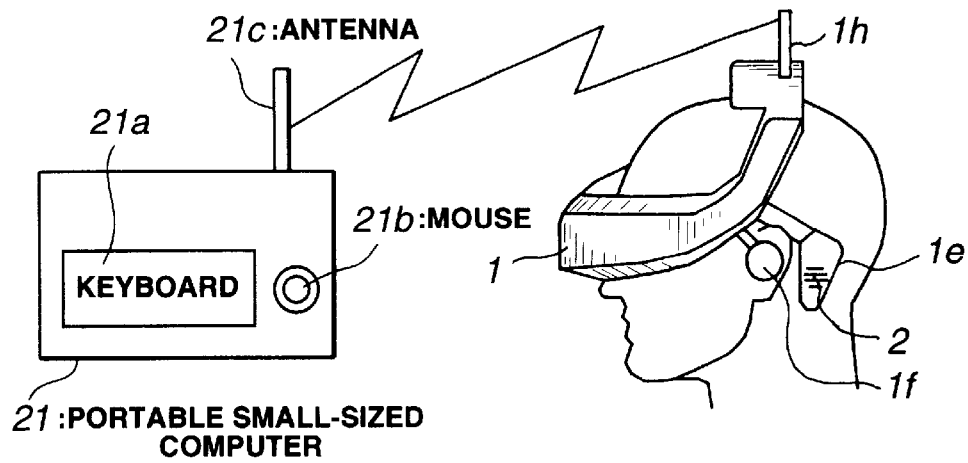
FIG. 8 is an illustration of the head mounted type display apparatus according to the first embodiment which is combined with a portable small-sized computer.

The head mounted type display apparatus 1 thus arranged is made to receive a picture signal or a caution signal transmitted from a portable small-sized computer 21 through an antenna 1h vertically extending from the top portion of the aforesaid frame section 1b as shown in FIG. 8 to display a picture or give a caution by way of a vibration.

The portable small-sized computer 21 (FIGS. 8 and 9) is made up of an antenna 21c for transmitting various kinds of signals as mentioned above, a keyboard 21a for inputting characters and others, and a mouse 21b for shifting an indicating position through a pointer.

Figure 9:
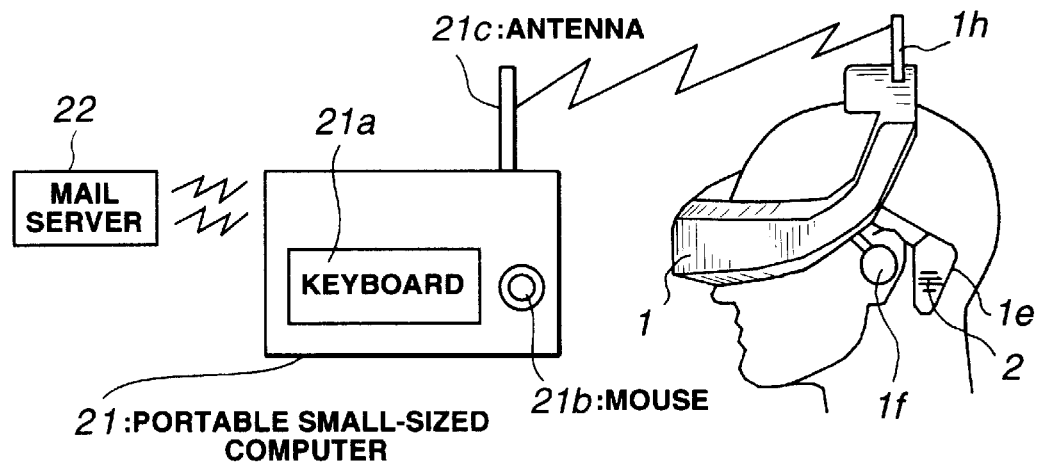
FIG. 9 is an illustration of the head mounted type display apparatus according to the first embodiment which is combined with a portable small-sized computer to receive an electronic mail from a mail server.

Furthermore, in the case of receiving an electronic mail or the like, as shown in FIG. 9, the electronic mail is transmitted from a mail server 22 to the aforementioned portable small-sized computer 21 which in turn, receives it to send a caution signal to the head mounted type display apparatus 1, whereupon the operator notices the caution signal and gives an instruction for reading the electronic mail. At this time, the portable small-sized computer 21 transmits the contents of the electronic mail to display the contents of the electronic mail on the display device 7 of the head mounted type display apparatus 1. Thus, the operator can read the electronic mail.

Since the aforesaid vibration device 2 is designed to generate vibration in the direction of pressing against the skin of the user, it can also serve as a mounting sensor. More specifically, when the user puts the head mounted type display apparatus 1 on his head section, the contact with the head section causes the pressing force against the vibration device 2, whereupon the vibration device 2 can detect, on the basis of this fact, whether or not the head mounted type display apparatus 1 is mounted on the head section of the user.

That is, on mounting the head mounted type display apparatus 1 on the head section of the user, in the example shown in FIG. 6, since a force of pressing toward the magnet 12 side is applied to the aforesaid tactile sense transferring section 14 and the coil 13 is slightly shifted, and therefore a current flows in the coil 13 crossing the magnetic flux of the magnet 12. Thus, the detection of the mounting condition becomes possible by detecting the current through the terminal 13a. On the other hand, when the head mounted type display apparatus 1 is detached or taken off from the head section, because of releasing from the pressing force, the coil 13 is shifted slightly in the direction opposite to the first shifting direction, whereupon a current also flows therein. Thus, the sensing of the detachment is possible by detecting the current through the terminal 13a.

Furthermore, in the example shown in FIG. 7, owing to the contact with the head section, a force of pressing toward the pressing pad 11 side works on the elastic member 19 so that the piezoelectric device 17 slightly contracts to generate an electric field, with the result that an electric potential difference occurs between the electrodes 18 and 16 to cause a current to flow. Thus, if detecting the current through the terminals 18a, 16a, the sensing of the mounting condition is possible. On the other hand, when the head mounted type display apparatus 1 is detached from the head section, due to the releasing from the pressing force, the piezoelectric device 17 is released from its contracted condition so that the generated electric field disappears and the electric charge staying in the electrodes 16, 18 for canceling the electric field flows as a current. Thus, if detecting this current through the terminals 16a, 18a, the sensing of the detachment is possible.

Figure 10:
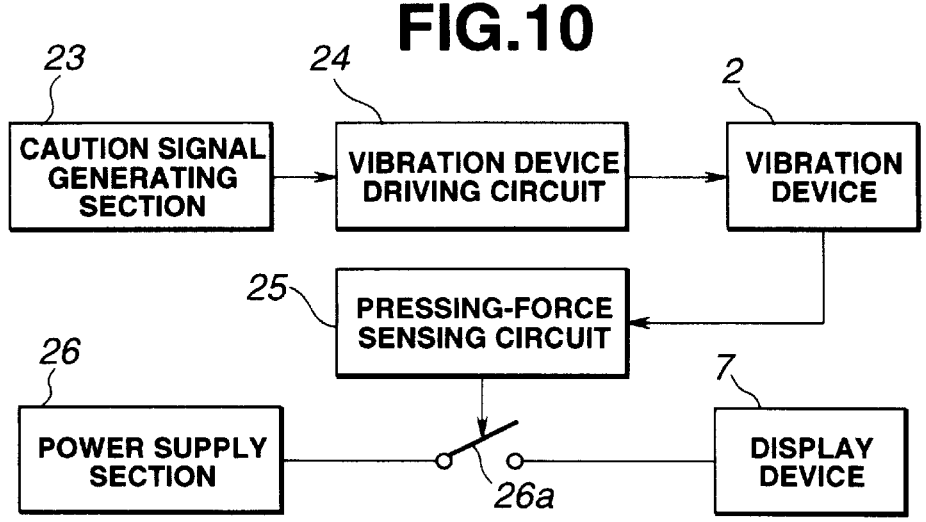
FIG. 10 is a block diagram showing an example of arrangements which detect a mounted condition by a vibration device and cut off the power supply to a display device and others when being in the non-mounted condition, in the head mounted type display apparatus according to the first embodiment.

Still further, in a case where the detection result of the mounted condition by the vibration device 2 shows that the head mounted type display apparatus 1 is not in the mounted condition, it is also appropriate that the power supply and picture supply signal to the display system including the display device 7 is cut off, or the power supply to other circuits is shut off, to cut down the power consumption. In this case, an arrangement therefor is as shown in FIG. 10.

For example, when a caution signal is sent from a caution signal generating section 23 of the portable small-sized computer 21 to a vibration device driving circuit 24 of the head mounted type display apparatus 1, the vibration device driving circuit 24 drives the vibration device 2 to generate vibration for giving a caution. Whereupon, the caution can be given to the user through his tactile sense. On the other hand, a current arises as mentioned above if applying a pressing force to the vibration device 2, and a pressing force sensing circuit 25 acting as a pressing force detecting means monitors this current. If a decision is made to that the head mounted type display apparatus 1 is in the detached condition, for example, after the elapse of a given time period, the power supply from a power supply section 26 to the display system including the display device 7 is cut off in a manner of turning off a switch 26a.

Moreover, it is also appropriate that the mode is automatically switched such that, when the pressing force sensing circuit 25 detects the mounted condition on the basis of the output of the vibration device 2 and the detection result shows that the head mounted type display apparatus 1 is not in the mounted condition, the caution signal is given as a sound through the speaker if without using the vibration by the vibration device 2.

Figure 11:
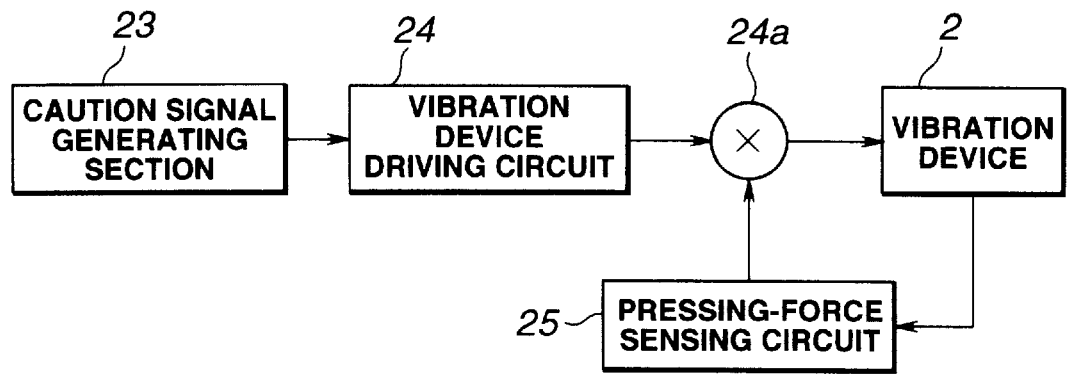
FIG. 11 is a block diagram showing an example of arrangements which sense a pressing force at the mounting time through a vibration device to give appropriate vibration in accordance with the pressing force, in the head mounted type display apparatus according to the first embodiment.

Furthermore, if the pressing force is sensed at the mounted time and the amplitude of the vibration is set to increase when the pressing force is weak while it is decreased when the pressing force is strong, it is possible to give appropriate vibration irrespective of the mounted condition. At this time, an arrangement therefor is as shown in FIG. 11.

Although the portion for driving the vibration device 2 through the vibration device driving circuit 24 by a caution signal from the caution signal generating section 23 is the same as that in FIG. 10, a multiplier 24a for adjusting the output of the vibration device driving circuit 24 is additionally placed between the vibration device driving circuit 24 and the vibration device 2. On the other hand, the pressing force against the vibration device 2 is monitored by the pressing force sensing circuit 25 when the head mounted type display apparatus 1 is in the mounted condition and the multiplier 24a is controlled in accordance with the degree of the pressing force so that the amplitude of the vibration device 2 or the like becomes adequate for giving a caution to the user.

Still further, the vibration device 2 can also be used as an operation inputting means for carrying out various kinds of operational inputs in information terminals, more specifically, as a click, for instance. If the user applies a pressing force for a short time period, such as pressing the vibration device 2 attached to, for example, the side head supporting point P3 by his finger, a current flows as mentioned before in accordance with this operation. Various kinds of operations are done in a manner that this current is sensed by the pressing force sensing circuit 25.

Figure 12:
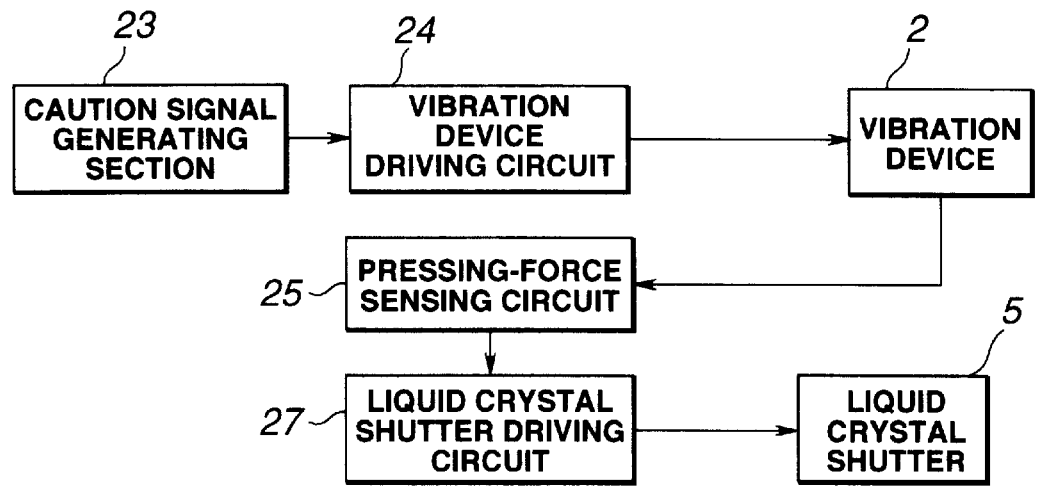
FIG. 12 is a block diagram showing an example of arrangements of the head mounted type display apparatus according to the first embodiment wherein a vibration device is used as a switch for switching modes of a liquid crystal shutter.

For instance, it is also appropriate to use the vibration device 2 as a switch for switching the above-mentioned modes of the liquid crystal shutter 5 of the head mounted type display apparatus 1. In this case, an arrangement therefor is as shown in FIG. 12.

The portion for driving the vibration device 2 through the vibration device driving circuit 24 on the basis of the caution signal from the caution signal generating section 23 is the same as that of FIG. 10. On the other hand, in cases where the pressing force against the vibration device 2 is monitored by the pressing force sensing circuit 25 and a decision is made to that the vibration device 2 is clicked by a finger or the like, through the liquid crystal shutter driving circuit 27 the liquid crystal shutter 5 is successively switched among the light intercepting mode, the see-through mode and the superimposing mode at every click.

Figure 13:
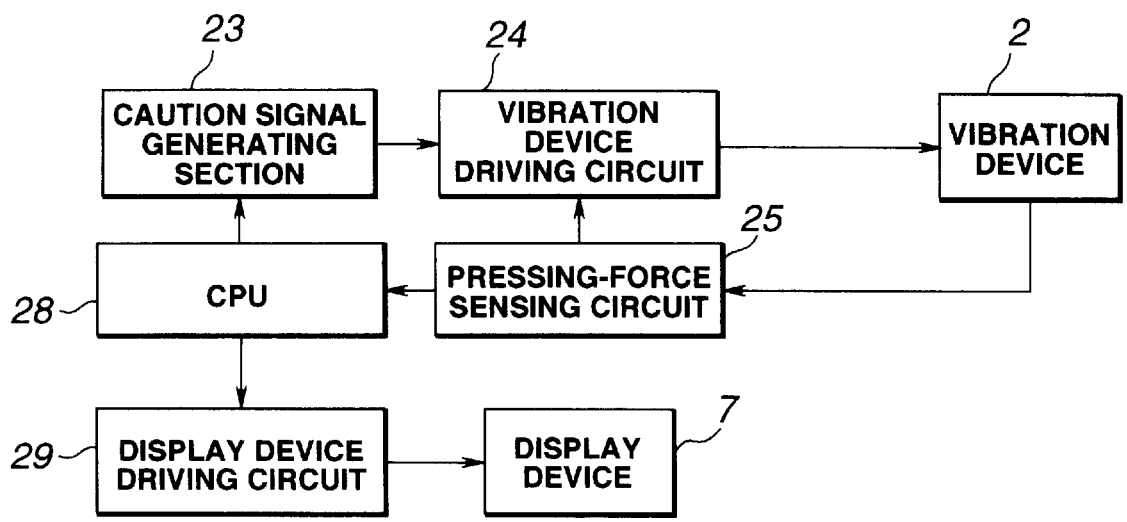
FIG. 13 is a block diagram showing an example of arrangements of the head mounted type display apparatus according to the first embodiment in which a vibration device is used as a vibration stopping switch for stopping the vibration of the vibration device itself.

The click of the vibration device 2 can additionally be used as the aforesaid vibration stopping switch 9 for stopping the vibration of the vibration device 2 itself. In this case, an arrangement therefor is as shown in FIG. 13.

The portion for driving the vibration device 2 through the vibration device driving circuit 24 on the basis of the caution signal from the caution signal generating section 23 is the same as that of FIG. 10.

On the other hand, in cases where the pressing force against the vibration device 2 is monitored by the pressing force sensing circuit 25 and a decision is made to that the vibration device 2 is clicked by a finger or the like, the pressing force sensing circuit 25 stops the vibration of the vibration device 2 through the vibration device driving circuit 24, and further the output of the pressing force sensing circuit 25 is inputted in a CPU 28, thus stopping the generation of the caution signal from the caution signal generating section 23. In cases where this caution signal is for the purpose of, for example, informing of the arrival of an electronic mail or if other cases, it is also appropriate that the CPU 28 stops the picture display on the display device 7 through a display device driving circuit 29 and displays a message on the electronic mail.

Figure 14:
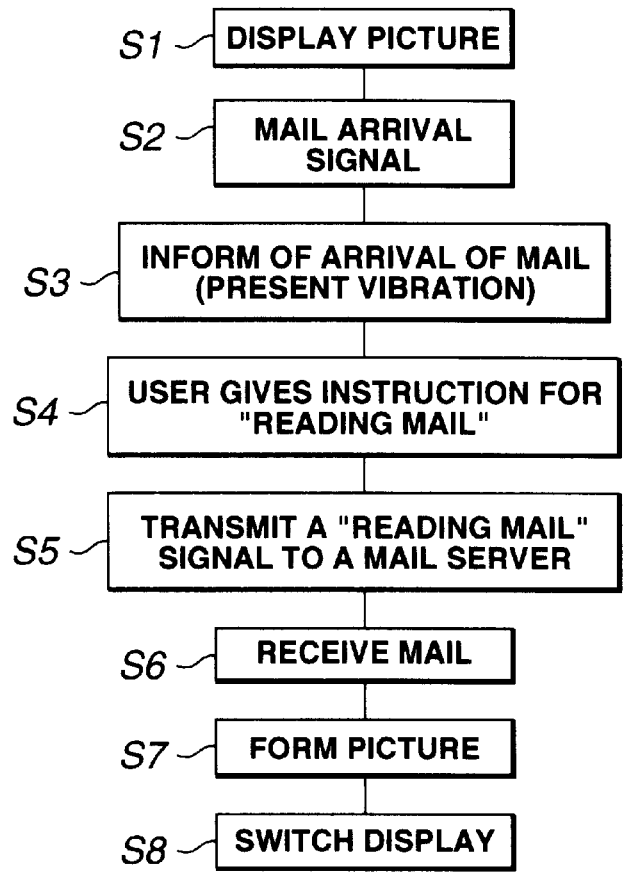
FIG. 14 is a flow chart showing an operation performed when generating a caution signal for informing the fact of reception of an electronic mail in the middle of a picture display, in the head mounted type display apparatus according to the first embodiment.

FIG. 14 is a flow chart showing an operation to be taken when generating a caution signal for informing of the arrival of an electronic mail in the middle of the picture display.

During the picture display (step S1), if a signal indicative of the arrival of an electronic mail is inputted (step S2), the vibration of the vibration device 2 occurs to inform the user of the arrival of the electronic mail (step S3). On noticing this vibration, the user gives an instruction for reading the electronic mail through an input switch or the like (step S4), and hence the portable small-sized computer 21 sends to the mail server 22 a signal for transferring the contents of the electronic mail (step S5), whereupon the portable small-sized computer 21 receives the contents of the electronic mail (step S6) and produces a picture signal (step S7) to transmit the picture signal to the head mounted type display apparatus 1. In response to the reception of this picture signal, the head mounted type display apparatus 1 switches the display to display a picture representative of the contents of the electronic mail (step S8).

Figure 15:
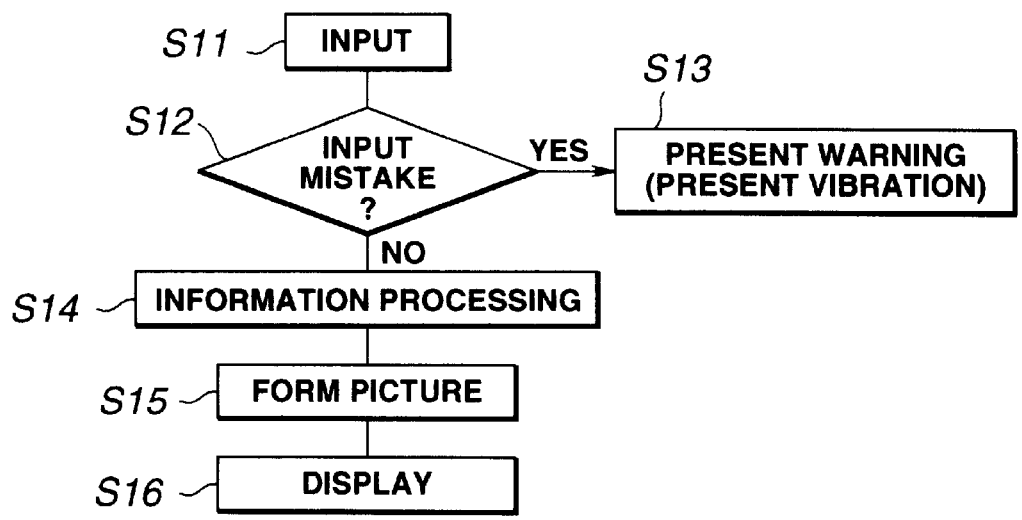
FIG. 15 is a flow chart showing an operation taken to issue a warning for when an operational mistake occurs during an operation for a picture display, in the head mounted type display apparatus according to the first embodiment.

FIG. 15 is a flow chart showing an operation for giving a warning about an operational mistake which occurs during a picture display operation.

An operational input is made through the portable small-sized computer 21 or the like (step S11), and a check is made whether there is an input mistake or not (step S12). If a mistake, the vibration of the vibration device 2 arises to give a warning to the user (step S13). At this time, it is also possible to, as mentioned before, vary the amplitude, frequency, waveform and others of the vibration in accordance with its significance.

On the other hand, if there is no mistake, information processing is done corresponding to the operational input (step S14), thereby producing a picture (step S15) and carrying out the display by the display device 7 (step S16).

According to this first embodiment, since giving vibration to the skin of the user to call attention through the tactile sense which is a sensation other than the visual sense for recognizing a picture and the auditory sense for recognizing a voice, it is possible to surely give a caution to the user. At this time, by selecting a skin portion with no hair as a portion placed into contact with the vibration device, it is possible to effectively provide vibration to the wearer. In addition, by varying the amplitude, frequency, waveform and others of the vibration, it is possible to give a plurality of kinds of cautions in accordance with its significance or the like.

Since the vibration to be given by the vibration device is made as vibration in the direction of pressing the skin, the vibration device can also be used as a mounting sensor. In the case of the use as the mounting sensor, it is possible to automatically cut down the power consumption, automatically switch a caution signal between vibration and a sound, and to automatically set an adequate vibration amplitude. Further, it is also possible to use it as a click for switching the modes and for stopping the vibration of the vibration device.

Furthermore, in the case of using a piezoelectric device or the like as a vibration device, since no magnetic field occurs as compared with the device using a coil, there is an advantage in that the head motion sensor using a magnetism does not deteriorate in accuracy.

Figure 16:
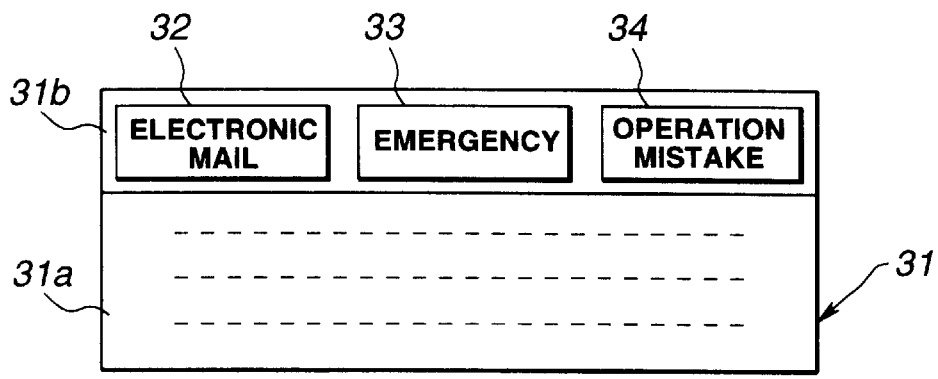
FIG. 16 is an illustration of an example of in-field displays in a head mounted type display apparatus according to a second embodiment of the present invention.

FIG. 16 is an illustration of a second embodiment of the present invention, showing an example of in-field displays in a head mounted type display apparatus. In this second embodiment, a description of the parts equal to those of the above-described first embodiment are omitted and a description will chiefly be made of only parts different therefrom.

In the head mounted type display apparatus according to this second embodiment, as shown in FIG. 4 or 5, a plurality of vibration devices 2, for example two vibration devices 2, are located at the right- and left-hand side head supporting points P3, and different kinds of caution signals can be given in a manner that these right- and left-hand vibration devices 2 are made to assume different vibrating conditions.

For instance, the vibration devices 2 are switched on the basis of the kinds of signals such that only the left-hand vibration device 2 vibrates for an electronic mail, only the right-hand vibration device 2 vibrates for an operational mistake, and both the right- and left-hand vibration devices 2 vibrate for an emergency signal.

Or, three vibration devices 2 are respectively situated at the forehead supporting point P2 and the right- and left-hand side head supporting points P3, and the kinds of signals and the locations of the vibration devices 2 take the one-to-one corresponding relation to each other such that the vibration device 2 at the left-hand side head supporting point P3 vibrates in the case of an electronic mail, the vibration device 2 at the right-hand side head supporting point P3 vibrates in the case of an operational mistake, and the vibration device 2 at the forehead supporting point P2 vibrates in the case of an emergency signal.

At this time, for example, the display by the head mounted type display apparatus may be as shown in FIG. 16.

That is, an information display bar 31b is placed at an upper portion of a picture display section 31a of an in-field display 31. In this information display bar 31b, successively placed from the left side are caution displays such as an electronic mail display 32 for informing of the arrival of an electronic mail, an emergency display 33 for informing of the input of an emergency signal and an operational mistake display 34 for informing of the occurrence of an operational mistake.

In more detail, the respective displays within the information display bar 31b are located to assume the same direction as that of the vibration displays by the vibration devices 2. More specifically, the electronic mail display 32 is placed on the left side within the information display bar 31b corresponding to the vibration of the left-hand vibration device 2 to inform of the arrival of an electronic mail, the emergency display 33 is located at a central portion within the information display bar 31b corresponding to the vibration of the right- and left-hand vibration devices 2 to inform of the input of an emergency signal, and the operational mistake display 34 is situated on the right side within the information display bar 31b corresponding to the vibration of the right-hand vibration device 2 to inform of the occurrence of an operational mistake.

The second embodiment thus arranged substantially offers the same effects as those of the above-described first embodiment, and in addition, vibration devices are attached at a plurality of locations so that the vibration devices to be vibrated are changed in accordance with the kinds of cautions to be given, thus allowing giving a plurality of cautions. Moreover, the caution displays by the display device and the vibration devices have the positional corresponding relation, and hence the kinds of cautions are more clearly confirmable.

Figure 17:
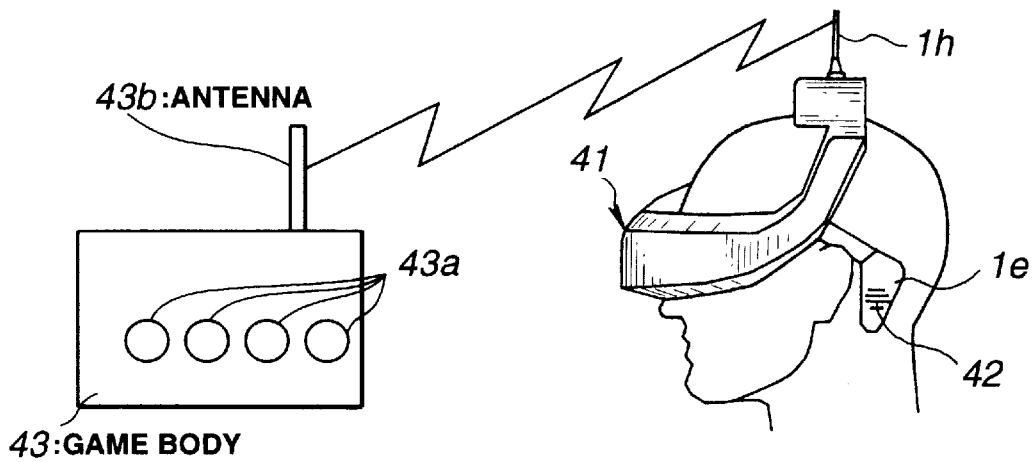
FIG. 17 is an illustration of a head mounted type display apparatus with a bone-conduction sound speaker according to a third embodiment of the present invention which is combined with a game machine.

FIGS. 17 to 20 are illustrations of a third embodiment of the present invention, and of these drawings, FIG. 17 shows an arrangement in which a head mounted type display apparatus having a bone-conduction sound speaker is combined with a game machine. In terms of this third embodiment, a description of the parts equal to those in the above-described first and second embodiments will be omitted, but a description will mainly be made of only the different points.

This head mounted type display apparatus, designated at numeral 41, is not equipped with the speaker 1f (FIG. 1), but a bone-conduction sound speaker 42 is instead installed at the side head supporting point P3 of the side head supporting section 1e.

Although it is also possible that the bone-conduction sound speaker 42 is installed at the forehead supporting point P2 or the like, the installation at the side head supporting point P3 is more preferable because this point P3 is closer to an ear which can lessen the staying of sound.

The aforesaid bone-conduction sound speaker 42 is designed so that a vibration device driven by an acoustic signal is directly brought into contact with the skin and its vibration is propagated through the skull or the like to reach the internal ear to present a sound. Since the bone-conduction sound is absorbed by the organism tissue in the process of the propagation, it is different in characteristic frequency region (the form of the distribution of a voice spectrum) from the air conduction sound, and has a characteristic that particularly a high-pitched tone extremely attenuates. Thus, this head mounted type display apparatus 41 includes a converter for converting a sound signal into a drive signal for the bone-conduction sound speaker.

In more detail, although this bone-conduction sound speaker 42 is composed of a vibration device having a construction substantially equal to that shown in FIG. 6 or 7, the difference in the third embodiment is that it is driven with a frequency by which a sound signal is transmittable, as compared with the above-described first embodiment in which it is driven with a relatively low frequency which is sensible through a tactile sense.

This head mounted type display apparatus 41 thus arranged is usable widely in cases where sound information is necessary, for instance, in the case of listening to a mail voice or of listening to an explanation while seeing a document or in the case of reproducing and listening to a video tape or a DVD (digital video disk), and particularly, is suitable, for example, in the case of playing a personal computer game such as a shooting game and a battle game, in cases where the leakage of the sound causes annoyance to the nearby people in a train or the like, and for a person who has difficulty in hearing but who can hear a bone-conduction sound.

FIG. 17 shows the case that the aforementioned head mounted type display apparatus 41 is combined with a game machine.

This game machine is designed to be used in a state where a game cassette is loaded on a game body 43, and the game body 43 includes a CPU and a memory which are capable of executing programs stored in the game cassette.

Furthermore, the game body 43 is provided with various controlling buttons 43a and an antenna 43b for transmitting a picture signal and a sound signal.

When a game starts in a state in which the game cassette is mounted in the game body 43, a picture signal and a sound signal are reproduced in accordance with a program in the game cassette and then transmitted through the antenna 43b.

The head mounted type display apparatus 41 receives them through the antenna 1h and displays a picture through the display device 7 and further makes the bone-conduction speaker 42 vibrate after the correction of the sound signal by the converter to transfer the vibration as a bone-conduction sound to the internal ear of the user.

In the case of employing the foregoing vibration device 2b shown in FIG. 7, since no magnetic field occurs, even if a head motion sensor using the magnetism is incorporated into the head mounted type display apparatus 41, the deterioration of the accuracy of the head motion sensor does not occur as in the case of being mentioned before.

Since the bone-conduction sound speaker 42 is composed of the vibration device shown in FIG. 6 or 7 and generates a current at the mounting and detachment as mentioned before, it can also be used as a mounting sensor. Thus, it is also appropriate that, if the detection of the mounted condition is made by the bone-conduction sound speaker 42 and the detection result shows no mounted condition, the power supply to the display system including the display device 7 is cut off and a picture supply signal is stopped or the power supply to other circuits are shut off, thereby reducing the power consumption. In this case, an arrangement therefor is as shown in FIG. 18.

When the sound signal is fed to a bone-conduction sound speaker driving circuit 44, the a bone-conduction sound speaker driving circuit 44 drives the bone-conduction sound speaker 42 to generate vibration for transferring a bone conduction sound. Whereupon, the user can receive the sound. On the other hand, a pressing force is applied to the bone-conduction sound speaker 42, a current occurs, and if this current is monitored by the pressing force sensing circuit 25 and a decision is made that the head mounted type display apparatus 41 is in the detached condition, for example, after the elapse of a given period of time, the power supply from the power supply section 26 to the display system including the display device 7 is cut off by turning off (i.e. opening) the switch 26a.

Figure 19:
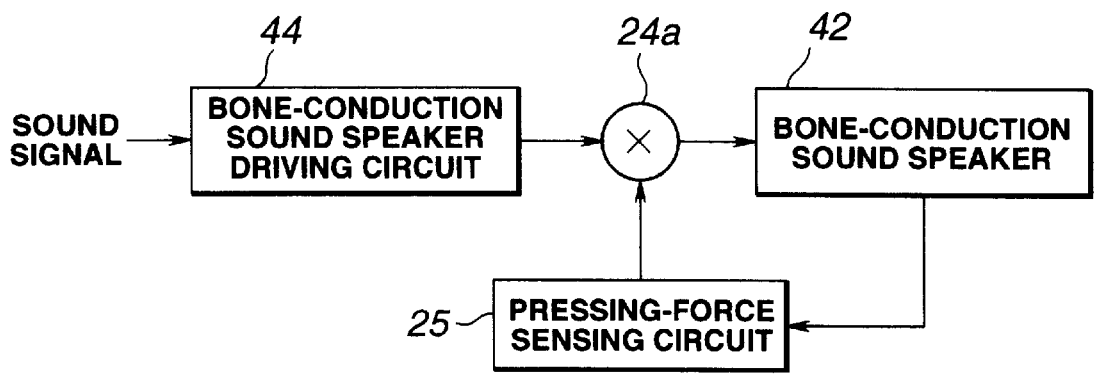
FIG. 19 is a block diagram showing an example of arrangements for sensing a pressing force at the mounting time through a bone-conduction sound speaker to provide vibration corresponding to an appropriate sound volume in accordance with the sensed pressing force, in the head mounted type display apparatus according to the third embodiment.

Furthermore, if the pressure of the bone-conduction sound speaker 42 is sensed at the mounted time and the amplitude of the vibration is set to be larger when the pressure is low while the amplitude of the vibration is set to be smaller when the pressure is high, the hearing is possible at an appropriate sound volume irrespective of whether or not it is in the mounted condition. In this case, an arrangement therefor is as shown in FIG. 19.

Figure 18:
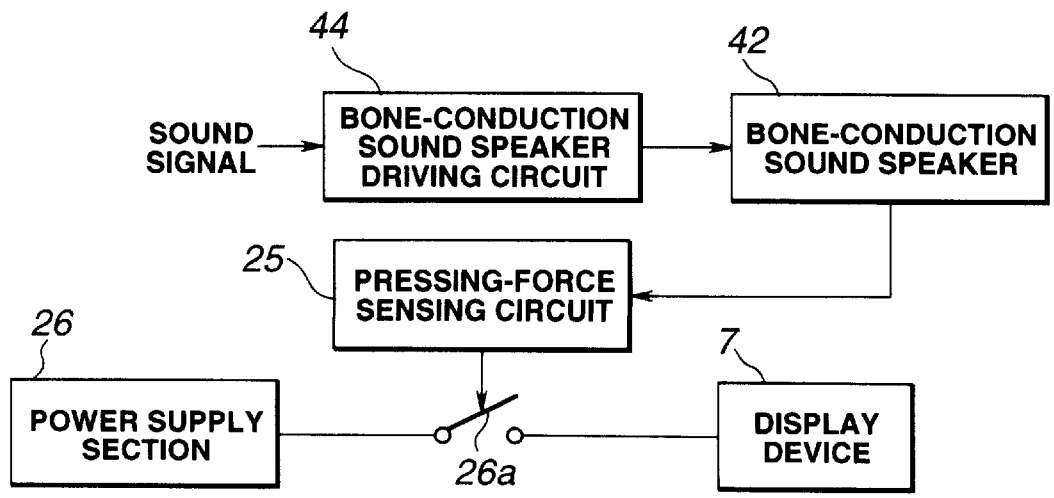
FIG. 18 is a block diagram showing an example of arrangements for detecting a mounted condition through a bone-conduction sound speaker to shut off the power supply to a display device and others when being in the nonmounted condition, in the head mounted type display apparatus according to the third embodiment.

Although the portion for receiving the sound signal to drive the bone-conduction sound speaker 42 through the bone-conduction sound speaker driving circuit 44 is the same as that in FIG. 18, a multiplier 24a is provided between the bone-conduction sound speaker driving circuit 44 and the bone-conduction sound speaker 42 to adjust the output of the bone-conduction sound speaker 44. On the other hand, the pressing force against the bone-conduction sound speaker 42 is monitored by the pressing force sensing circuit 25 when the head mounted type display apparatus 41 is in the mounted condition and the multiplier 24a is controlled in accordance with the degree of the pressing force so that the amplitude of the bone-conduction sound speaker 42 or the like becomes appropriate for the transmission of a bone conduction sound to the user.

Moreover, the bone-conduction sound speaker 42 can also be used as an operational input means for achieving various kinds of operational inputs in the information terminal, more particularly, as a click, for example. If the user applies a pressing force for a short time, for example, by pressing the bone-conduction sound speaker 42, fitted at the side head supporting point P3, by his finger and then releasing it from being pressed, a current flows in accordance with this operation as mentioned before. For performing various kinds of operations, the detection of this current is done through the pressing force sensing circuit 25.

Figure 20:
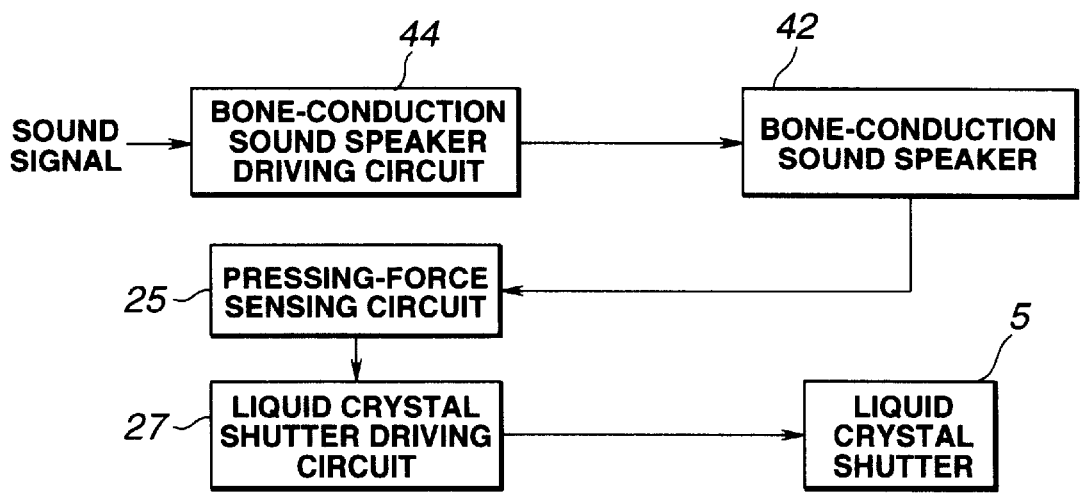
FIG. 20 is a block diagram showing an example of arrangements of the head mounted type display apparatus according to the third embodiment, wherein a bone-conduction sound speaker is used as a switch for switching the modes of a liquid crystal shutter.

It is also possible that, for example, the bone-conduction sound speaker 42 is used as a switch for switching the modes of the liquid crystal shutter 5 of the head mounted type display apparatus 41. In this case, an arrangement therefor is as shown in FIG. 20.

The portion for receiving the sound signal to drive the bone-conduction sound speaker 42 through the bone-conduction sound speaker driving circuit 44 is the same as that in FIG. 18. On the other hand, in the case that the pressing force against the bone-conduction sound speaker 42 is monitored by the pressing force sensing circuit 25 and a decision is made to that the bone-conduction sound speaker 42 is clicked by a finger or the like, through the liquid crystal shutter driving circuit 27 the liquid crystal shutter 5 is successively switched among the light intercepting mode, see-through mode and superimposing mode at every click.

The third embodiment thus arranged can substantially offer the same effects as those of the above-described first and second embodiments, and in addition, the head mounted type display apparatus can be decreased in weight as compared with the cause of using a common air conduction type speaker. Moreover, because of the employment of the bone-conduction sound speaker, the correct mounting adjustment to the ear's position becomes unnecessary unlike the prior air conduction type speaker. In addition, since no leakage to the external surrounding occurs, it does not cause annoyance to the other people in a train or the like, and it is suitable for a person who has difficulty in hearing but can hear a bone conduction sound.

Although in the above description a common air conduction type speaker is not provided therein, it is also possible that both the bone-conduction sound speaker and the air conduction type speaker are provided to be used respectively in the right place.

Figure 21:
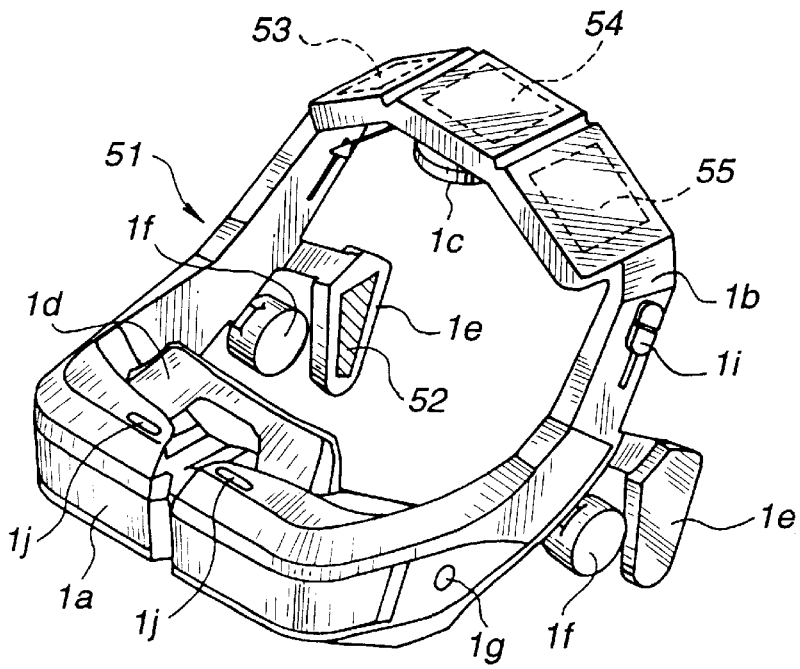
FIG. 21 is a perspective view showing a head mounted type display apparatus having a bone-conduction sound microphone at its right side head supporting section according to a fourth embodiment of the present invention.
Figure 22:
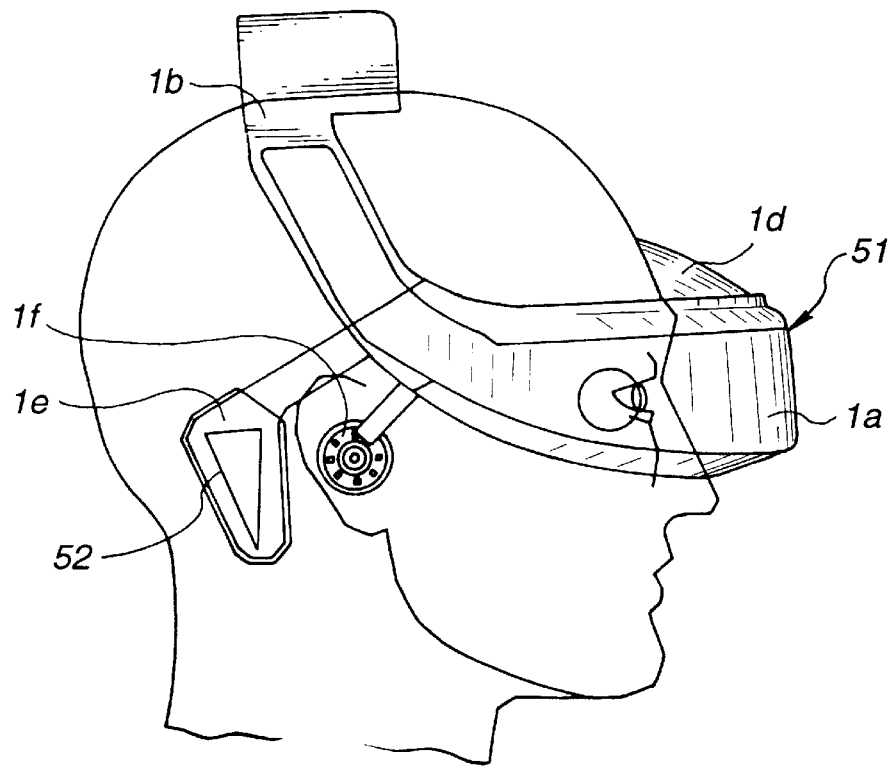
FIG. 22 is a perspective view showing showing a state where the head mounted type display apparatus according to the fourth embodiment which has the bone-conduction sound microphone at its right side head supporting section is mounted on a head section of the user, which is viewed from a side direction.
Figure 23:
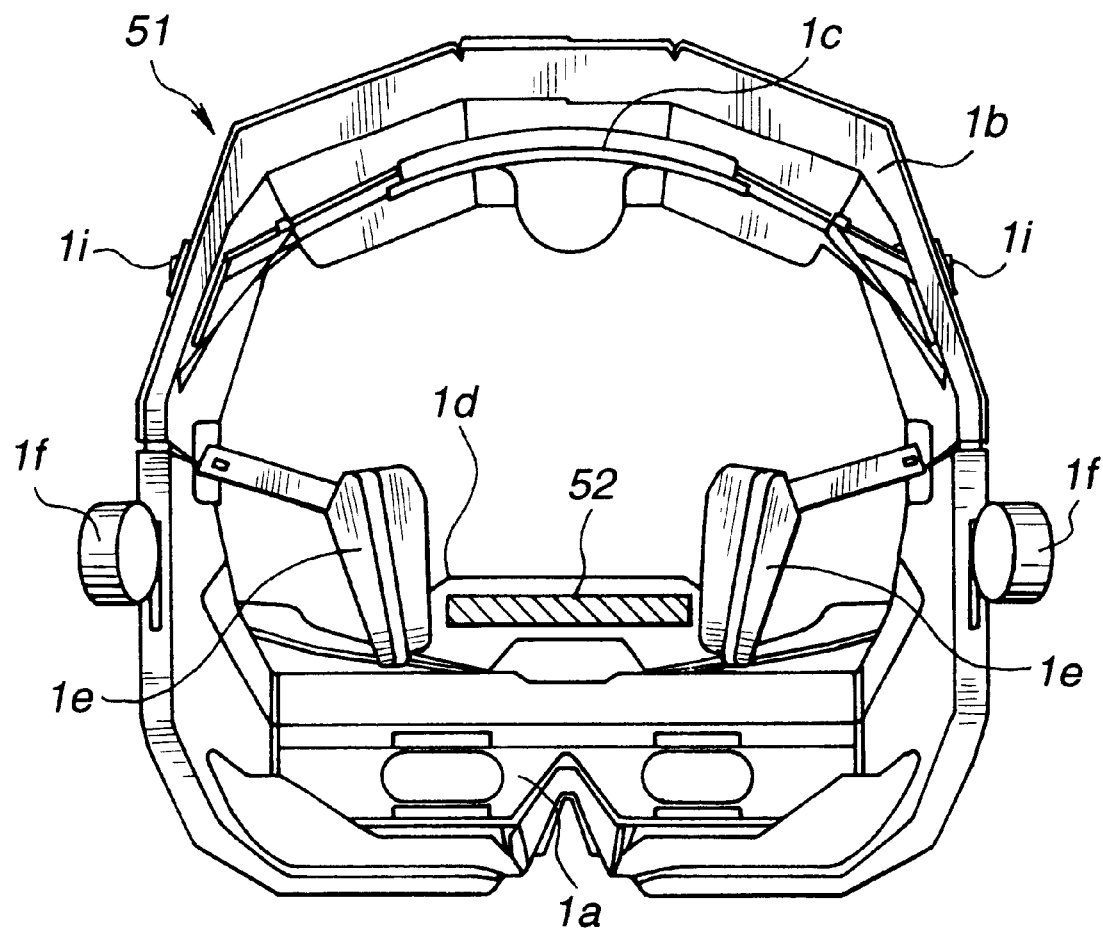
FIG. 23 is a bottom view showing a head mounted type display apparatus according to the fourth embodiment which has a bone-conduction sound microphone at its forehead resting section.

FIGS. 21 to 25 are illustrations of a fourth embodiment of the present invention, and of these drawings, FIG. 21 is a perspective view showing a head mounted type display apparatus in which a bone-conduction sound microphone is installed on the right-hand side head supporting section and FIG. 22 is a perspective view showing the state where the head mounted type display apparatus having the bone-conduction sound microphone at its right-hand side head supporting section is mounted on the head section of the user, which is viewed from a side direction. In this fourth embodiment, a description of the parts equal to those in the above-described first to third embodiments will be omitted while a description will be made of only the different parts.

In this head mounted type display apparatus 51, a bone-conduction sound microphone 52 is provided at the right-hand side head supporting point P3, and a memory 53, a battery 54 and a CPU 55 are built in the frame section 1b.

The bone-conduction sound microphone 52 can be placed at the right- and left-hand side head supporting points P3, at the forehead supporting point P2 (FIG. 1) of the forehead resting section 1d or in the ear opening. In this case, because the side head supporting points P3 are closer to the vocal cord for generating a sound, as compared with the other supporting points, at this point it is possible to pick up a relatively excellent sound.

The aforesaid bone-conduction sound microphone 52 is made such that a vibration device to be driven by an acoustic signal is directly placed into contact with the skin to pick up acoustic vibration propagating through the skull or the like. Because the bone conduction sound is different in characteristic frequency region from the air conduction sound as mentioned before, this head mounted type display apparatus 51 is provided with a converter for converting into a sound signal the signal picked up through the bone-conduction sound microphone.

This bone-conduction sound microphone 52 is, in more detail, composed of a vibration device substantially equal to that shown in FIG. 6 or 7, and as compared with the first embodiment in which the vibration device is driven with a relatively low frequency which is sensible through the tactile sense, in this third embodiment the vibration device is driven with a frequency close to that of the sound signal and a current due to this vibration device is detected and derived as a sound signal.

Figure 24:
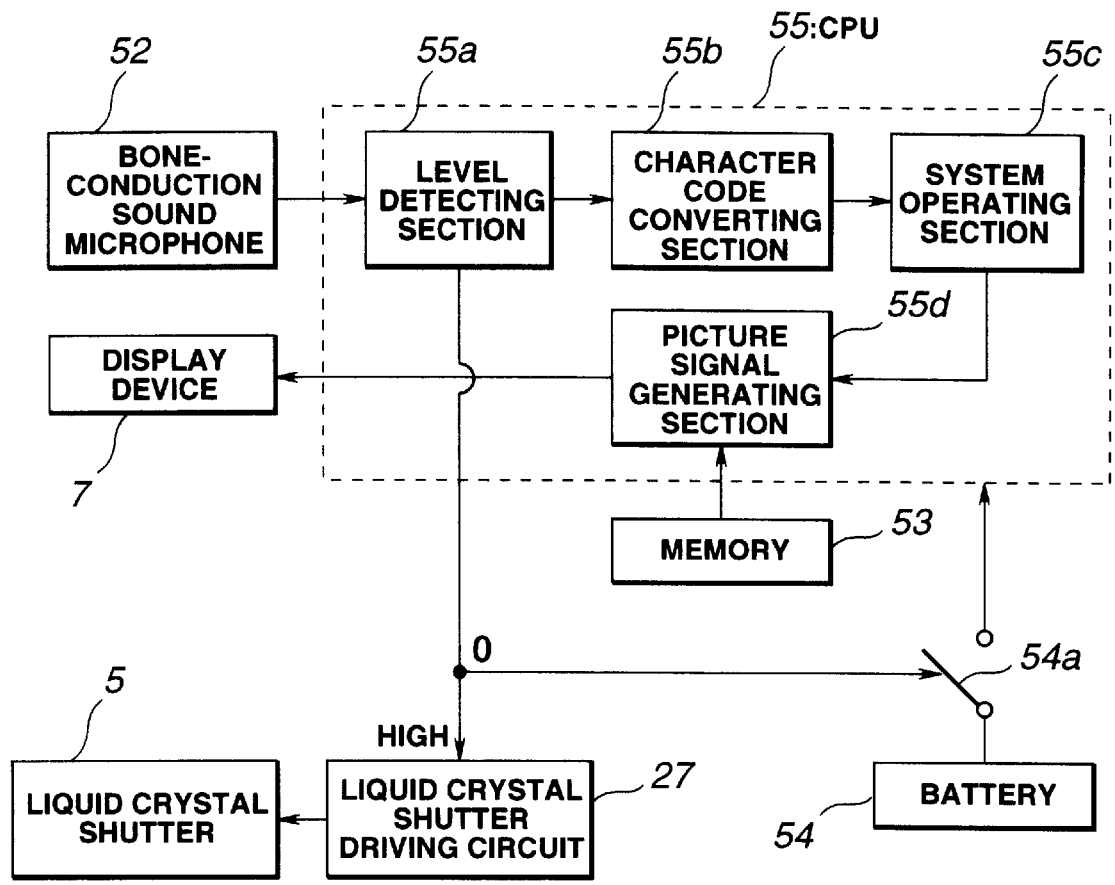
FIG. 24 is a block diagram showing an example of arrangements for detecting a mounted condition through a bone-conduction sound microphone to cut off the power supply to a CPU and others when being in the non-mounted condition, in the head mounted type display apparatus according to the fourth embodiment.

Since the bone-conduction sound microphone 52 is composed of the vibration device shown in FIG. 6 or 7 and generates a current at the mounting and detaching time as mentioned above, it can also be used as a mounting sensor. Thus, the following operation can be taken. That is, the detection of the mounted condition is made by the bone-conduction sound microphone 52 and, when the detection result shows that it is not in the mounted condition, the power supply to the display system including the display device 7 is cut off and the picture supply signal is stopped or the power supply to the other circuits is shut off, thereby reducing the power consumption. In this case, an arrangement therefor may be as shown in FIG. 24.

The output of the bone-conduction sound microphone 52 is inputted in a level detecting section 55a of a CPU 55 to be compared with a given threshold value to check whether this head mounted type display apparatus 51 is mounted on the head section. If the decision is that it is mounted on the head section, the sound vibration is inputted in the aforesaid bone-conduction sound microphone 52 to be converted into an electric signal and outputted and then inputted in a character code converting section 55b through the level detecting section 55a to be converted into a character code signal corresponding to the sound signal. This character code signal is sent through a system operating section 55c to a picture signal generating section 55d which in turn, produces a picture signal corresponding to a character code while referring to the memory 53, with the picture signal being outputted to the display device 7 to be visibly displayed as character information.

Incidentally, a power is supplied from the battery 54 through a switch 54a to the aforesaid CPU 55 and the other circuits.

On the other hand, in the level detecting section 55a, if a decision is made to that this head mounted type display apparatus 51 is not mounted in the head section (indicated with "0" in the illustration), for example, after waiting for a given period of time, the switch 54a is turned off (i.e. opened) on the basis of the output of the level detecting section 55a and the power supply to the respective circuits (including the display system such as the display device 7) including the CPU 55 is shut off, thereby reducing the power consumption.

Furthermore, the bone-conduction sound microphone 52 can also be used as an operational input means for performing various operational inputs in the information terminals, in more detail, for example a click. When the user applies a pressing force for a short time, for example, by pressing the bone-conduction sound microphone 52 fitted at the side head supporting point P3 by his finger and then releasing it from being pressed, a current flows in accordance with this operation as mentioned above. For executing various operations, the level detecting section 55a detects this current.

For example, the bone-conduction sound microphone 52 can also be used as a switch for switching the modes of the liquid crystal shutter 5 of the head mounted type display apparatus 51.

In this case, if the bone-conduction sound microphone 52 is pressed by a finger or the like, the level detecting section 55a detects this operation on the basis of the output of the bone-conduction sound microphone 52 (indicated with "high" in the illustration), and through the liquid crystal shutter driving circuit 27 the liquid crystal shutter 5 is switched successively among the light intercepting mode, the see-through mode and the superimposing mode, for example, at every click.

Figure 25:
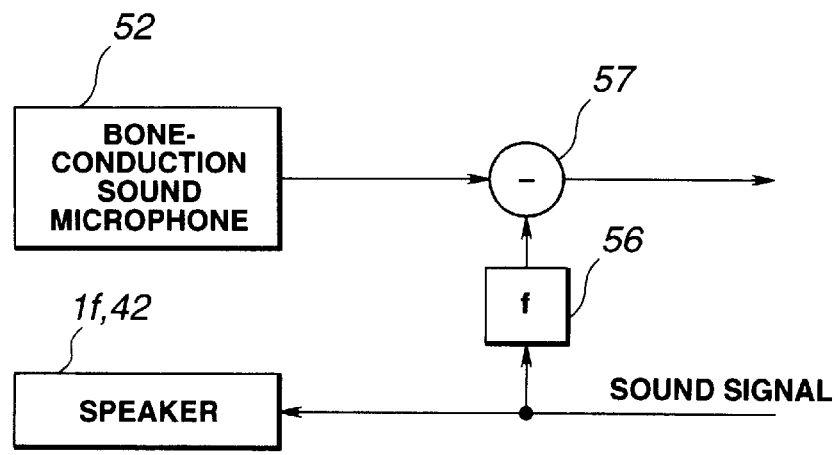
FIG. 25 is a block diagram showing an arrangement for suppressing the occurrence of howling by a speaker and a bone-conduction sound microphone in the fourth embodiment.

Furthermore, since the head mounted type display apparatus 51 is provided with the speaker 1f and the bone-conduction sound microphone 52 as mentioned above, there is a possibility that a howling occurs if the sound of the speaker 1f is inputted in the bone-conduction sound microphone 52. Accordingly, it has an arrangement as shown in FIG. 25 in order to suppress this howling.

More specifically, a sound signal to be outputted to the speaker 1f is further inputted into a converter 56 being a sound signal converting means having a given transfer function. Further, an external sound inputted through the bone-conduction sound microphone 52 undergoes the subtraction of the output of the aforesaid converter 56 in a subtracter 57 serving as a canceling means for the removal of the howling component and then is processed as an inputted sound signal.

The transfer function is a function predetermined taking into consideration the deformation of the characteristic frequency region which occurs because the sound outputted from the speaker lf is absorbed by the skull and the organism tissue in the process of being inputted in the bone-conduction sound microphone 52. In addition, because of depending upon the fitting positions of the speaker 1f and the bone-conduction sound microphone 52, that is, the contact positions with the head section, the transfer function is also determined in consideration with this.

The fourth embodiment can substantially offer the same effects as those of the above-described first to third embodiments, and in addition, it is possible to perform the sound input without increasing its weight. Moreover, it is possible to suppress the occurrence of howling by subtracting the outputted sound signal processed with a given transfer function from the inputted signal.

Figure 26:
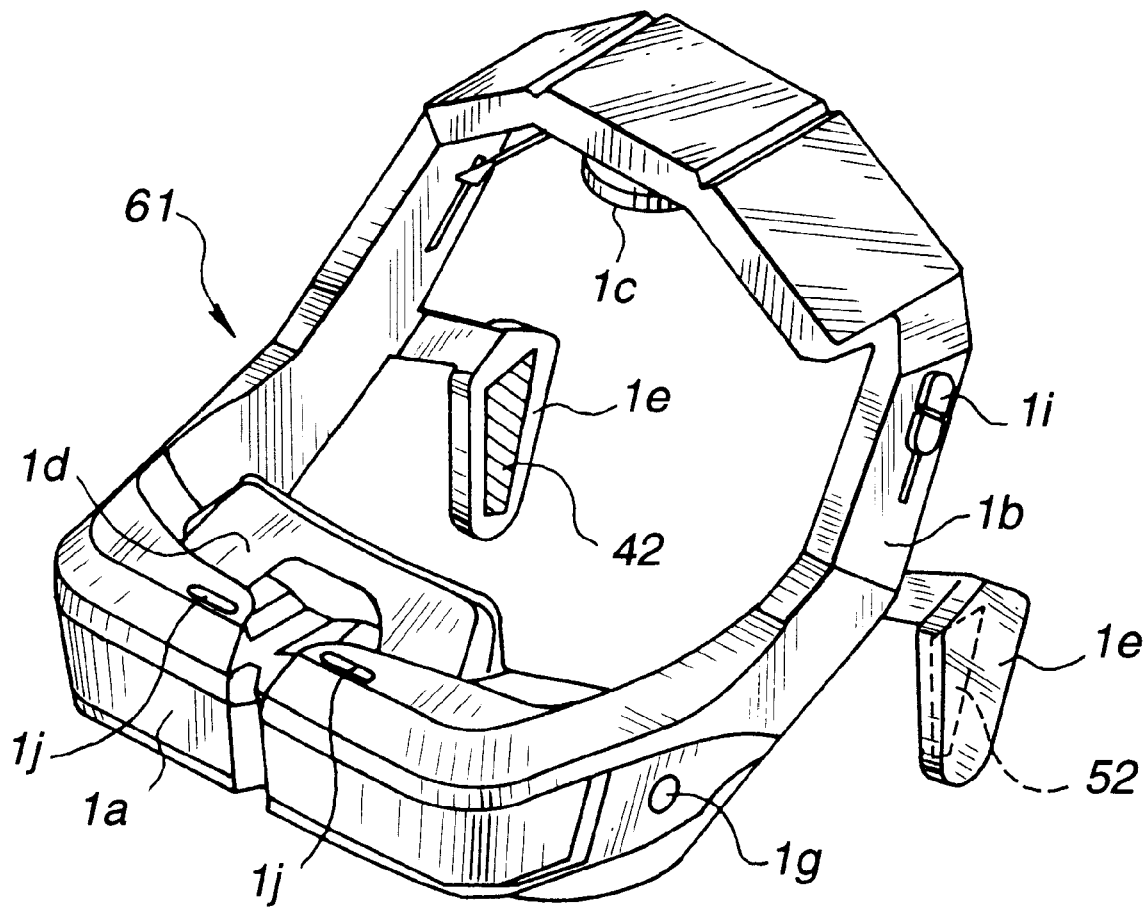
FIG. 26 is a perspective view showing a head mounted type display apparatus comprising a bone-conduction sound speaker and a bone-conduction sound microphone according to a fifth embodiment of the present invention.

FIG. 26 is an illustration of a fifth embodiment of the present invention, and is a perspective view showing a head mounted type display apparatus equipped with a bone-conduction sound speaker and a bone-conduction sound microphone. In the fifth embodiment, a description of the parts corresponding to those in the above-described first to fourth embodiments will be omitted, and a description will mainly be taken of only the different points.

In the head mounted type display apparatus 61 according to this embodiment, a bone-conduction sound speaker 42 is placed on one of the side head supporting sections 1e, for example, at the right-hand side head supporting point P3, whereas a bone-conduction sound microphone 52 is located on the other side head supporting section 1e, for example, at the left-hand side head supporting point P3. Accordingly, the speaker 1f is unnecessary and hence is not provided therein.

The arrangements of the bone-conduction sound speaker 42 and the bone-conduction sound microphone 52 are the same as those in the third and fourth embodiments.

Furthermore, this head mounted type display apparatus 61 is also provided with the arrangement for suppressing the howling as shown in FIG. 25.

More specifically, the sound signal to be outputted to the bone-conduction sound speaker 42 is further inputted to a converter 56 arranged to have a given transfer function Further, an external sound inputted through the bone-conduction sound microphone 52 undergoes the subtraction of the output of the converter 56 in a subtracter 57 for the removal of the howling components and then is processed as an inputted sound signal.

The fifth embodiment can substantially offer the same effects as those in the above-described first to fourth embodiments, and in addition, the speaker and the microphone can be provided without increasing its weight.

Figure 27:
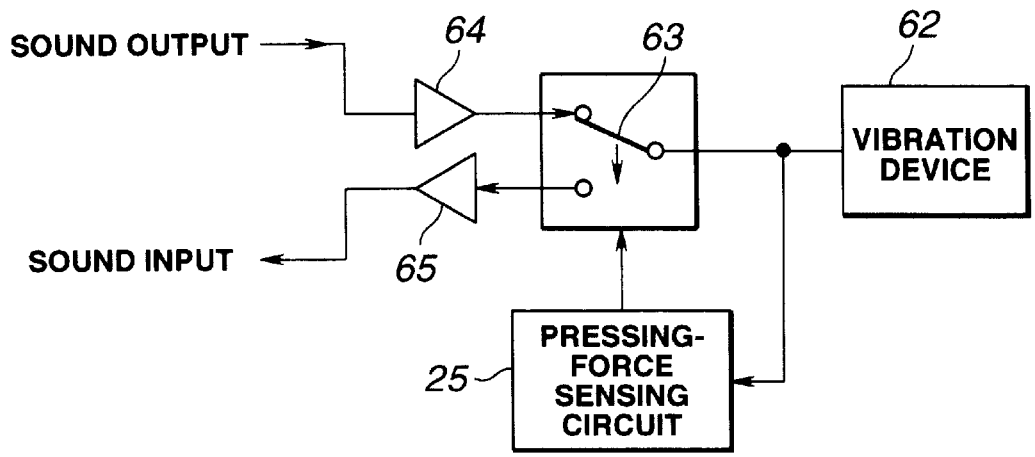
FIG. 27 is a block diagram showing a principal portion of an electric arrangement of a head mounted type display apparatus having a vibration device switchable to a bone-conduction sound speaker and a bone-conduction sound microphone, according to a sixth embodiment of the present invention.

FIG. 27 is an illustration of a sixth embodiment of the present invention, and is a block diagram showing a principal portion of an electric arrangement of a head mounted type display apparatus equipped with a vibration device combining a bone-conduction sound speaker and a bone-conduction sound microphone through a switching operation. In this sixth embodiment, a description of the parts corresponding to those in the first to fifth embodiments will be omitted, and a description will chiefly be made of only the different points.

The head mounted type display apparatus according to this embodiment is provided with a vibration device 62 whereby the switching between the function of the bone-conduction sound speaker and the function of the bone-conduction sound microphone is possible in a manner that a switch 63 is switched to a position shown in FIGS. 3, 4, 5 or other illustrations.

More specifically, in this head mounted type display apparatus, the output of the vibration device 62 is inputted to a pressing force sensing circuit 25, and when the user presses the vibration device 62 by his finger to generate a click, the pressing sensing circuit 25 detects the click and controls the switch 63 to switch the input and output of a speech or sound.

In the case that the switch 63 being a switching means is switched to the speech outputting side, that is, the side where the vibration device 62 is used as the bone-conduction sound speaker, a sound output signal is amplified in an amplifier 64 and then passes through the switch 63 to drive the vibration device 62 which in turn, generates vibration.

On the other hand, in the case that the switch 63 is switched to the speech inputting side, that is, the side where the vibration device 62 is used as the bone-conduction sound microphone, an input signal picked up by the vibration device 62 passes through the switch 63 and is amplified in an amplifier 65 and then inputted as a sound signal.

Although in the above description the vibration device 62 also serves as a means to perform an operational input for switching the switch 63, it is also possible to add an operating member for controlling the switch 63.

This sixth embodiment can substantially offer the same effects as those of the above-described first to fifth embodiments, and in addition, it is possible to carry out the speech output and input with only single vibration device. Moreover, the switching between the speech output and input is possible with the same vibration device.

Figure 28:
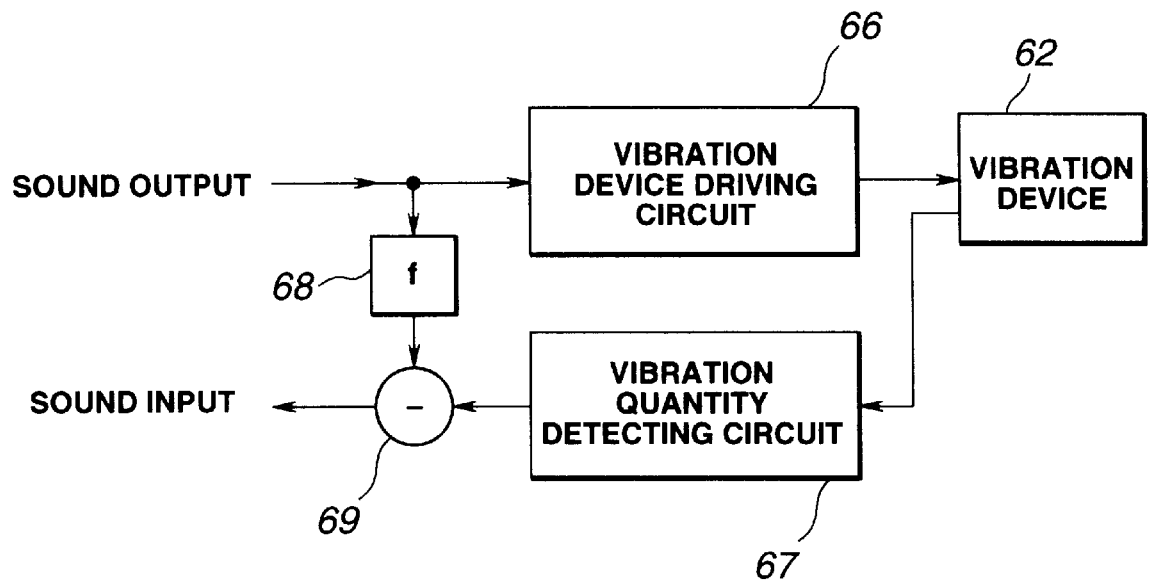
FIG. 28 is a block diagram showing a principal portion of an electric arrangement of a head mounted type display apparatus having a vibration device combining a bone-conduction sound speaker and a bone-conduction sound microphone, according to a seventh embodiment of the present invention.

FIG. 28 is an illustration of a seventh embodiment of the present invention, and is a block diagram showing a principal portion of an electrical arrangement of a head mounted type display apparatus equipped with a bone-conduction sound speaker and a bone-conduction sound microphone. In this seventh embodiment, a description of the parts corresponding to those in the above-described first to sixth embodiments will be omitted, and a description will mainly be given of only the different parts.

In the head mounted type display apparatus according to this embodiment, a vibration device 62 combining a bone-conduction sound speaker and a bone-conduction sound microphone is placed at a position shown in FIGS. 3, 4, 5 or other illustrations.

More specifically, in this head mounted type display apparatus, in the case of outputting a sound, the vibration device 62 is driven by a sound output signal through the use of a vibration device driving circuit 66 to generate vibration.

The sound output signal is further inputted in a converter 68 being a sound signal converting means arranged to have a given transfer function.

Furthermore, in the case of inputting a sound, an input signal picked up by the vibration device 62 is detected by a vibration quantity detecting circuit 67 and then inputted in a subtracter 69 being a canceling means, where it undergoes the subtraction of the output of the converter 68 for removing the speech output component and howling component and is inputted as a sound signal.

That is, in the vibration device 62, there are superimposed vibrations serving as an outputted speech and driven by the vibration device driving circuit 66, vibrations due to the howling component which again vibrates the vibration device 62 itself after this outputted speech is transferred to the skull or the organism tissue, and vibrations acting as an inputted speech and generating due to an external speech. Thus, with the subtraction and removal of the sound output component and the howling component, it is possible to excellently pick up the inputted speech.

In the case of using one vibration device 62, the input and output of a monophonic speech are possible. On the other hand, in the case of employing a plurality of vibration devices 62, the input and output of a stereo speech are possible.

This seventh embodiment can offer the same effects as those of the above-described first to sixth embodiments, and in addition, the same vibration device can simultaneously act for the speech input and output, thus providing a simple and low-cost arrangement.

In this invention, it is apparent that working modes different in a wide range can be formed on basis of this invention without departing from the spirit and scope of the invention. This invention is not restricted by any specific embodiment except as may be limited by the appended claims.

What is claimed is:

1. A head mounted type display apparatus comprising:
   a display device for displaying an optical picture based on an inputted picture signal;
   an ocular optical system for projecting said picture to an eye of a user;
   a supporting section having a contact surface for supporting said display device and said ocular optical system through said contact surface on a head section including a head and face of said user; and
   a vibration device placed on said contact surface of said supporting section, said vibration device engaging said head section and vibrating in response to an input of a caution signal which is a signal for alerting said user.

2. A head mounted type display apparatus as defined in claim 1, wherein said supporting section includes at least one of a forehead pressing section for pressing a forehead of said user and side head pressing sections for pressing right- and left-hand side head portions of said user as portions having said contact surface, and said vibration device is placed on at least one of these forehead pressing section and said right- and left-hand side head pressing sections.

3. A head mounted type display apparatus as defined in claim 1, wherein said vibration device changes its vibration in accordance with a type of a caution signal applied thereto.

4. A head mounted type display apparatus as defined in claim 1, wherein said vibration device is composed of a plurality of vibration devices located at a plurality of portions of said supporting section, and said plurality of vibration devices each change their vibrations accordance with a type of caution signal, said change of vibration including stopping a vibration of at least one vibration device.

5. A head mounted type display apparatus as defined in claim 4, wherein said display device has a caution display, comprising a visual display for alerting said user, corresponding to a kind of caution signal, and said vibration device is located on said supporting section to take a position corresponding to a visual location of a caution display in said display device.

6. A head mounted type display apparatus as defined in claim 1, wherein said vibration device generates vibration including a component in a direction perpendicular to said contact surface of said supporting section, and further comprising pressing force detecting means for detecting a signal outputted from said vibration device when a pressing force is applied to said vibration device and for outputting a pressing force signal.

7. A head mounted type display apparatus as defined in claim 6, wherein, when a decision is made based on said pressing force signal from said pressing force detecting means that said head mounted type display apparatus is not mounted on said head section, a power supply to a display system including at least said display device is cut off or suppressed.

8. A head mounted type display apparatus as defined in claim 6, wherein at least one of a current value and a voltage value to be inputted to said vibration device is controlled based on said pressing force signal from said pressing force detecting means to obtain optimal vibration corresponding to said pressing force.

9. A head mounted type display apparatus as defined in claim 6, wherein said vibration device also serves as operational input means for performing an operational input, and a detection is made whether or not an operational input is made based on said pressing force signal from said pressing force detecting means.

10. A head mounted type display apparatus as defined in claim 6, wherein said ocular optical system also serves as an optical system for projecting external light to an eye of said user, and further comprising external light quantity varying means for varying a quantity of external light to be projected to the eye of said user, with said external light quantity varying means being controlled based on said pressing force signal from said pressing force detecting means.

11. A head mounted type display apparatus as defined in claim 6, wherein the vibration of said vibration device is stopped based on said pressing force signal from said pressing force detecting means.

12. A head mounted type display apparatus comprising:
a display device for displaying an optical picture based on an inputted picture signal;
an ocular optical system for projecting said picture to an eye of a user;
a supporting section having a contact surface and supporting said display device and said ocular optical system through said contact surface on a head section including a head and face of said user; and
a bone-conduction sound speaker placed on said contact surface of said supporting section, said bone-conduction sound speaker vibrating in response to an input of a sound signal.

13. A head mounted type display apparatus as defined in claim 12, wherein said supporting section includes side head pressing sections for pressing right- and left-hand side head portions of said user as portions having said contact surface, and said bone-conduction sound speaker is placed on each of said right- and left-hand side head pressing sections.

14. A head mounted type display apparatus as defined in claim 12, further comprising pressing force detecting means for detecting a signal outputted from said bone-conduction sound speaker when a pressing force is applied to said bone-conduction sound speaker to output a pressing force signal.

15. A head mounted type display apparatus as defined in claim 14, wherein, when a decision is made based on said pressing force signal from said pressing force detecting means that said head mounted type display apparatus is not mounted on said head section, a power supply to a display system including at least said display device is cut off or suppressed.

16. a head mounted type display apparatus as defined in claim 14, wherein at least one of a current value and a voltage value to be inputted to said bone-conduction sound speaker is controlled based on said pressing force signal from said pressing force detecting means to obtain optimal vibration corresponding to said pressing force.

17. A head mounted type display apparatus as defined in claim 14, wherein said bone-conduction sound speaker also serves as operational input means for performing an operational input, and a detection is made whether or not an operational input is made based on said pressing force signal from said pressing force detecting means.

18. A head mounted type display apparatus as defined in claim 14, wherein said ocular optical system further serves as an optical system for projecting external light to an eye of said user, and further comprising external light quantity varying means for varying a quantity of external light to be projected to the eye of said user, with said external light quantity varying means being controlled based on said pressing force signal from said pressing force detecting means.

19. A head mounted type display apparatus comprising:
a display device for displaying an optical picture based on an inputted picture signal;
an ocular optical system for projecting said optical picture to an eye of a user;
a supporting section having a contact surface and supporting said display device and said ocular optical system through said contact surface on a head section including a head and face of said user; and
a bone-conduction device for detecting a bone conduction sound propagating in said head section of said user and for imparting vibration to the head of the user.

20. A head mounted type display apparatus as defined in claim 19, wherein said bone conduction device is placed on said contact surface of said supporting section.

21. A head mounted type display apparatus as defined in claim 20, wherein said supporting section includes at least one of a forehead pressing section for pressing a forehead of said user and side head pressing sections for pressing right-and left-hand side head portions of said user as portions having said contact surface, and said bone-conduction sound microphone is placed on at least one of said forehead pressing section and said right- and left-hand side head pressing sections.

22. A head mounted type display apparatus as defined in claim 21, wherein a bone-conduction sound speaker which vibrates when receiving an input of a sound signal is located on at least one section of said supporting section where said bone-conduction sound microphone is not placed.

23. A head mounted type display apparatus as defined in claim 20, wherein, when a decision is made on the basis of an inputted signal from said bone-conduction sound microphone that said head mounted type display apparatus is not mounted on said head section, a power supply to a display system including at least said display device is cut off or suppressed.

24. A head mounted type display apparatus as defined in claim 20, wherein said bone-conduction sound microphone also serves as operational input means for performing an operational input.

25. A head mounted type display apparatus as defined in claim 20, wherein said ocular optical system further serves as an optical system for projecting external light to an eye of said user, and further comprising external light quantity varying means for varying a quantity of the external light to be projected to the eye of said user, with said external light quantity varying means being controlled when an inputted signal from said bon-conduction sound microphone exceeds a given threshold value.

26. A head mounted type display apparatus as defined in claim 19, further comprising:

a speaker for receiving an input of a sound signal to generate a sound, sound signal converting means for converting said sound signal based on a given transfer function; and canceling means for subtracting a sound signal converted by said sound signal converting means from an inputted signal from said bone-conduction sound microphone to cancel a sound component generated by said speaker.

27. A head mounted type display apparatus comprising:

a display device for displaying an optical picture based on an inputted picture signal;

an ocular optical system for projecting said picture to an eye of a user;

a supporting section having a contact surface and supporting said display device and said ocular optical system through said contact surface on a head section including a head and face of said user; and a vibration device combining a bone-conduction sound speaker which vibrates in response to an input of a sound signal and a bone-conduction sound microphone which detects a bone conduction sound propagating in said head section of said user.

28. A head mounted type display apparatus as defined in claim 27, wherein said vibration device is placed on said contact surface of said supporting section.

29. A head mounted type display apparatus as defined in claim 27, further comprising switching means for conducting switching between a function of said bone-conduction sound speaker and a function of said bone-conduction sound microphone which are achieved by said vibration device.

30. A head mounted type display apparatus as defined in claim 29, wherein said switching means performs switching between said functions when a decision is made based on an output of said vibration device when said vibration device is pressed.

31. A head mounted type display apparatus as defined in claim 27, further comprising:

sound signal converting means for converting a sound signal outputted to said vibration device based on a given transfer function; and canceling means for subtracting an outputted sound signal converted by said sound signal converting means from an inputted signal from said vibration device to cancel a sound component generated from said vibration device.

32. A head mounted type display apparatus comprising:

a display device for displaying an optical picture based on an inputted picture signal;

an ocular optical system for projecting said optical picture to an eye of a user;

a supporting section having a contact surface and supporting said display device and said ocular optical system through said contact surface on a head section including a head and face of said user; and a vibration device provided on said contact surface of said supporting section for selectively performing one of a delivery of vibration to said user and a reception of vibration from said user.

* * * * *

UNITED STATES PATENT AND TRADEMARK OFFICE
CERTIFICATE OF CORRECTION

PATENT NO : 5,986,813
DATED : November 16, 1999
INVENTOR(S) : Haruko Saikawa and Seiichiro Tabata It is certified that error appears in the above-identified patent and that said Letters Patent are hereby corrected as shown below:

At column 2, line 60, delete "be" and insert -- being --.
At column 3, line 18, delete "bath" and insert --both--.
At column 3, line 22, delete "surrounding" and insert -- surroundings --.
At column 4, line 52, after the word "of" insert -- a --.
At column 5, line 4, delete "nonmounted" and insert -- non-mounted --.
At column 6, line 19, delete "rear" and insert -- rearwardly --.
At column 7, line 3, delete "woth" and insert -- with --.
At column 8, line 49, delete "Further." and insert -- Further, --.
At column 12, line 49, delete "vibration" and insert -- vibrations --.
At column 15, lines 28-29, delete "bone conduction" and insert -- bone-conduction --.
At column 16, line 31, delete "surrounding" and insert -- surroundings --.
At column 16, lines 34-35, delete "bone conduction" and insert -- bone-conduction --.
At column 19, line 9, after "function" insert -- . --.
At column 20, line 49, after "on" insert -- the --.

IN THE CLAIMS:
In claim 4, column 21, line 16, after "vibrations" insert -- in --.
In claim 16, column 22, line 30, delete "a" and insert -- A --.

UNITED STATES PATENT AND TRADEMARK OFFICE
CERTIFICATE OF CORRECTION

PATENT NO. : 5,986,813
DATED : November 16, 1999
INVENTOR(S) : Haruko Saikawa and Seiichiro Tabata It is certified that error appears in the above-identified patent and that said Letters Patent is hereby corrected as shown below:

In claim 25, column 23, line 31, delete "bon-conduction" and insert -- bone-conduction --.

Signed and Sealed this

Eighth Day of May, 2001

Attest:

NICHOLAS P. GODICI

Attesting Officer

Acting Director of the United States Patent and Trademark Office